(12) United States Patent
Smith et al.

(10) Patent No.: US 12,719,824 B2
(45) Date of Patent: Aug. 25, 2026

(54) ENRICHMENT OF CONTACT RECORDS WITH TRANSFER DATA

(71) Applicant: State Farm Mutual Automobile Insurance Company, Bloomington, IL (US)

(72) Inventors: Darin A Smith, Le Roy, IL (US); Michael Scott Heihn, Normal, IL (US); Christopher Carroll, Bloomington, IL (US); Prashant G Hiremath, Normal, IL (US); Ramalakshmi Kiran Kandury, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 117 days.

(21) Appl. No.: 18/786,220

(22) Filed: Jul. 26, 2024

(65) Prior Publication Data

US 2025/0039116 A1 Jan. 30, 2025

Related U.S. Application Data

(60) Provisional application No. 63/516,058, filed on Jul. 27, 2023.

(51) Int. Cl.
*H04L 51/216* (2022.01)
*H04L 51/04* (2022.01)
*H04L 51/07* (2022.01)

(52) U.S. Cl.
CPC ............ *H04L 51/216* (2022.05); *H04L 51/04* (2013.01); *H04L 51/07* (2022.05)

(58) Field of Classification Search
None
See application file for complete search history.

(56) References Cited

U.S. PATENT DOCUMENTS 6,188,761 B1 * 2/2001 Dickerman ............. H04M 3/51 379/91.01
6,563,788 B1 * 5/2003 Torba ........................ H04L 9/40 370/410
7,110,998 B1 * 9/2006 Bhandari ............ G06F 16/2465 382/229
7,200,614 B2 * 4/2007 Reid ........................ G09B 7/00 379/265.09
8,996,642 B1 * 3/2015 Bellini, III ........... G06Q 30/016 709/224
9,866,695 B1 1/2018 Modi
10,192,179 B1 * 1/2019 Agarwal ........ G06Q 10/063114
(Continued)

*Primary Examiner* — Backhean Tiv
(74) *Attorney, Agent, or Firm* — Lee & Hayes, P.C.

(57) ABSTRACT

A contact record enrichment system receives contact records generated by a contact center platform in association with individual contacts handled by a contact center. If multiple contacts are part of a contact chain associated with the same customer journey, such as a customer journey that involves one or more transfers between different contacts, the contact record enrichment system enriches corresponding contact records with transfer data about the entire customer journey. The transfer data added to an individual contact record for an individual contact in the customer journey causes the contact record to indicate information about the entire customer journey, in addition to information about the individual contact.

20 Claims, 5 Drawing Sheets

Record for Contact 548753

Contact Details

Representative: Kelly Johnson ← 302
Start Time: 06/15/2023 12:50pm
End Time: 06/15/2023 12:54pm
Initiated Via: Transfer

| # | Contact ID | Start Time | End Time | Initiation Method | Queue ID | Rep. | Transcript |
|---|---|---|---|---|---|---|---|
| 1 | 513253 | 06/15/2023 12:46pm | 06/15/2023 12:50pm | Inbound | A | John Smith | Hello, I have a problem with... |
| **2 *Current Record*** | **548753** | **06/15/2023 12:50pm** | **06/15/2023 12:54pm** | **Transfer** | **D** | **Kelly Johnson** | **Hi, they said you could ...** |
| 3 | 578143 | 06/15/2023 12:54pm | 06/15/2023 1:02pm | Transfer | E | Mark Brown | The last person said... |
| 4 | 592127 | 06/15/2023 1:02pm | 06/15/2023 1:10pm | Transfer | B | Mary Allen | My issue is... |

(56) References Cited

U.S. PATENT DOCUMENTS

| | | | | |
|---|---|---|---|---|
| 10,986,230 | B1 * | 4/2021 | Sethi | H04L 51/216 |
| 11,410,127 | B2 * | 8/2022 | Azmoon | G06Q 10/06311 |
| 11,418,647 | B1 * | 8/2022 | Peterson | H04M 3/5175 |
| 11,671,535 | B1 * | 6/2023 | Petropoulos | H04M 3/42059<br>379/265.1 |
| 11,909,830 | B2 * | 2/2024 | Abdul-Malik | G06Q 40/02 |
| 12,143,429 | B1 * | 11/2024 | Jepperson | H04L 65/1069 |
| 2008/0250109 | A1 * | 10/2008 | Jakobson | G06Q 30/04<br>709/206 |
| 2011/0280391 | A1 * | 11/2011 | Venugopal | H04M 3/523<br>379/266.1 |
| 2012/0155630 | A1 * | 6/2012 | Raghavan | H04M 3/51<br>379/265.02 |
| 2013/0060871 | A1 * | 3/2013 | Downes | H04L 12/1827<br>709/206 |
| 2017/0031536 | A1 * | 2/2017 | Shah | G06Q 10/40 |
| 2019/0089605 | A1 * | 3/2019 | Bellini, III | G06Q 10/20 |
| 2019/0130413 | A1 * | 5/2019 | Nelson | G06F 16/244 |
| 2019/0156838 | A1 * | 5/2019 | Kannan | G10L 15/26 |
| 2019/0197457 | A1 * | 6/2019 | Chan | G06Q 10/063112 |
| 2020/0159653 | A1 * | 5/2020 | Raghupathy | G06F 11/3696 |
| 2020/0159827 | A1 * | 5/2020 | Vozila | G06F 40/289 |
| 2020/0311739 | A1 * | 10/2020 | Chopra | G06Q 30/016<br>704/270.1 |
| 2020/0349581 | A1 * | 11/2020 | Petluru | G06Q 30/016 |
| 2021/0004706 | A1 * | 1/2021 | Riddle | G06F 40/30 |
| 2021/0096549 | A1 * | 4/2021 | Kraszewski | G05B 19/41865 |
| 2022/0012673 | A1 * | 1/2022 | O'Carroll | G06Q 10/063114 |
| 2022/0138257 | A1 | 5/2022 | Gueta | |
| 2023/0186225 | A1 * | 6/2023 | Vepa | G06F 40/295<br>705/7.42 |
| 2025/0039116 | A1 * | 1/2025 | Smith | H04L 51/04 |

* cited by examiner

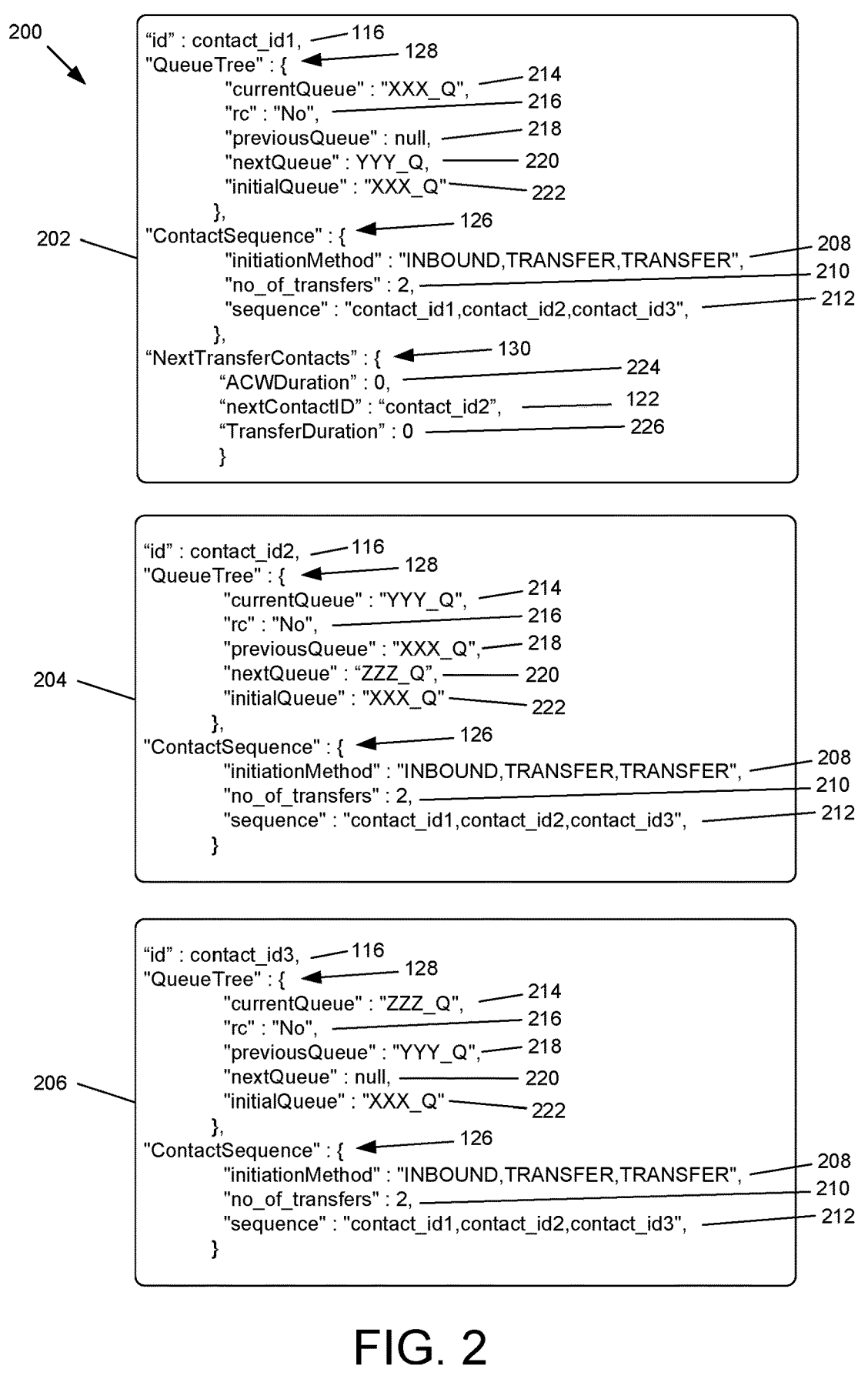

200

202

"id" : contact_id1, 116
"QueueTree" : { 128
"currentQueue" : "XXX_Q", 214
"rc" : "No", 216
"previousQueue" : null, 218
"nextQueue" : YYY_Q, 220
"initialQueue" : "XXX_Q" 222
},
"ContactSequence" : { 126
"initiationMethod" : "INBOUND,TRANSFER,TRANSFER", 208
"no_of_transfers" : 2, 210
"sequence" : "contact_id1,contact_id2,contact_id3", 212
},
"NextTransferContacts" : { 130
"ACWDuration" : 0, 224
"nextContactID" : "contact_id2", 122
"TransferDuration" : 0 226
}

204

"id" : contact_id2, 116
"QueueTree" : { 128
"currentQueue" : "YYY_Q", 214
"rc" : "No", 216
"previousQueue" : "XXX_Q", 218
"nextQueue" : "ZZZ_Q", 220
"initialQueue" : "XXX_Q" 222
},
"ContactSequence" : { 126
"initiationMethod" : "INBOUND,TRANSFER,TRANSFER", 208
"no_of_transfers" : 2, 210
"sequence" : "contact_id1,contact_id2,contact_id3", 212
}

206

"id" : contact_id3, 116
"QueueTree" : { 128
"currentQueue" : "ZZZ_Q", 214
"rc" : "No", 216
"previousQueue" : "YYY_Q", 218
"nextQueue" : null, 220
"initialQueue" : "XXX_Q" 222
},
"ContactSequence" : { 126
"initiationMethod" : "INBOUND,TRANSFER,TRANSFER", 208
"no_of_transfers" : 2, 210
"sequence" : "contact_id1,contact_id2,contact_id3", 212
}

FIG. 2

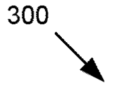

Record for Contact 548753

Contact Details

Representative: Kelly Johnson
Start Time: 06/15/2023 12:50pm
End Time: 06/15/2023 12:54pm
Initiated Via: Transfer

302

Customer Journey Timeline

304

| # | Contact ID | Start Time | End Time | Initiation Method | Queue ID | Rep. | Transcript |
|---|---|---|---|---|---|---|---|
| 1 | 513253 | 06/15/2023 12:46pm | 06/15/2023 12:50pm | Inbound | A | John Smith | Hello, I have a problem with... |
| **2** ***Current Record*** | **548753** | **06/15/2023 12:50pm** | **06/15/2023 12:54pm** | **Transfer** | **D** | **Kelly Johnson** | **Hi, they said you could ...** |
| 3 | 578143 | 06/15/2023 12:54pm | 06/15/2023 1:02pm | Transfer | E | Mark Brown | The last person said... |
| 4 | 592127 | 06/15/2023 1:02pm | 06/15/2023 1:10pm | Transfer | B | Mary Allen | My issue is... |

FIG. 3

ENRICHMENT OF CONTACT RECORDS WITH TRANSFER DATA

RELATED APPLICATIONS

This U.S. Patent application claims priority to provisional U.S. Patent Application No. 63/516,058, entitled "ENRICHMENT OF CONTACT RECORDS WITH TRANSFER DATA," filed on Jul. 27, 2023, the entirety of which is incorporated herein by reference.

TECHNICAL FIELD

The present disclosure relates to contact records corresponding to contacts with a contact center, and more particularly to enriching contact records with transfer data associated with a contact chain that includes multiple contacts with the contact center during a customer journey.

BACKGROUND

A contact center associated with a business or other entity can engage in contacts, such as calls, chat sessions, email exchanges, text messages, and/or other types of communications with customers or other individuals. A software platform associated with the contact center may generate contact records associated with individual contacts, such that the records can be reviewed to determine information about the contacts. For instance, a contact record associated with a particular contact can be reviewed to determine which representative at the contact center handled the contact, determine a duration of the contact, determine how the contact was initiated, determine how the contact concluded, and/or other information about the contact.

In some situations, multiple contacts can be related to the same "customer journey" of a customer, such that the multiple contacts are part of the same contact chain. For example, if a customer calls the contact center via a first contact with a first representative, the first representative may transfer the customer's call to a second representative such that the customer begins a new second contact with the second representative. In this example, the first contact and the second contact may be part of a shared contact chain that is associated with the customer's journey through interactions with the contact center.

Management or other personnel at the contact center may use contact records to determine metrics associated with representatives, individual contacts, chains of contacts during larger customer journeys, and/or other elements. Representatives at the contact center may also use contact records to review what happened during any previous contacts during a contact chain associated with a customer journey.

However, in many systems it can be difficult to determine from individual contact records whether corresponding individual contacts were linked to other contacts within a contact chain as part of a larger customer journey. Some systems may indicate whether a contact represented by a particular contact record is linked to an immediately-preceding contact and/or an immediately-subsequent contact. However, even if a contact record indicates that a contact followed an immediately-preceding contact during a customer journey, the contact record may not indicate whether there were any additional earlier contacts during the customer journey, and/or how many earlier contacts occurred during the customer journey before the immediately-preceding contact. Similarly, even if a contact record indicates that a contact ended with a transfer to an immediately-subsequent contact, the contact record may not indicate whether and/or how many additional later contacts followed that immediately-subsequent contact during the same customer journey.

This can make it difficult to review the full context of a contact chain associated with a customer journey, as users may have to separately look up individual contact records associated with different individual contacts to determine if the contacts followed or preceded other contacts that are also associated with the same customer journey. Moreover, even if connections between individual contact records associated with the same customer journey can be determined, many systems are configured to present information associated with a single contact record. Accordingly, such systems may not be configured to display or provide comprehensive information about a chain of multiple contacts, associated with a larger customer journey, concurrently via a user interface.

Additionally, operations used by many existing systems to look up and/or display individual contact records may occur at different times, and/or via different windows or user interface views of a software platform, thereby increasing utilization of computing resources. For instance, a computing system may use memory, processing cycles, and/or other computing resources to look up and/or display information associated with a single contact, such that usage of such computing resources is increased when the computing system separately looks up and/or displays information associated with multiple distinct contacts.

The example systems and methods described herein may be directed toward mitigating or overcoming one or more of the deficiencies described above.

SUMMARY

Described herein are systems and methods associated with a contact record enrichment system, which can be configured to enrich contact records generated by a contact center platform with transfer data. Each contact record can be associated with a single contact handled by a contact center. However, if multiple contacts are associated with the same contact chain, such as a contact chain associated with a customer journey that involves one or more transfers between different contacts, the contact record enrichment system can enrich each of the corresponding contact records associated with the customer journey with transfer data that indicates information about the entire contact chain. Accordingly, when any single one of the contact records is accessed, the transfer data added to that contact record can indicate information about the overall contact chain associated with the customer journey, in addition to information about the individual contact that is associated with the single contact record.

According to a first aspect, a computer-implemented method includes receiving, by an enrichment system, a contact record generated by a contact center platform. The contact record is associated with a first text chat session with a first representative, and a first contact identifier of the first text chat session. The computer-implemented method also includes determining, by the enrichment system, that the contact record indicates a second contact identifier of a second text chat session, with a second representative, that occurred before or after the first text chat session during a contact chain. The computer-implemented method further includes enriching, by the enrichment system, the contact record with transfer data associated with the contact chain.

The transfer data includes at least one of a contact sequence indicating an order of the first contact identifier of the first text chat session and the second contact identifier of the second text chat session, a transfer count indicating a number of transfers that have occurred during the contact chain, or indications of initiation methods associated with the first text chat session and the second text chat session.

According to a second aspect, a computing system includes one or more processors and memory. The memory stores computer-executable instructions that, when executed by the one or more processors, cause the one or more processors to receive a contact record associated with a first contact with a first representative of a contact center. The contact record is associated with a first contact identifier and includes a first transcript of the first contact. The computer-executable instructions also cause the one or more processors to determine that the contact record indicates a second contact identifier of a second contact, with a second representative of the contact center, that occurred before or after the first contact during a contact chain. The computer-executable instructions further cause the one or more processors to enrich the contact record with transfer data associated with the contact chain. The transfer data includes a contact sequence indicating an order of the first contact identifier of the first contact and a second contact identifier of the second contact. The contact sequence, in the transfer data in the contact record, causes a user interface to display a transcript associated with the contact chain in response to the contact record being accessed via the user interface. The transcript includes the first transcript of the first contact stored in the contact record, and a second transcript of the second contact, identified by the second contact identifier, stored in a second contact record.

According to a third aspect, one or more non-transitory computer-readable media store computer-executable instructions associated with an enrichment system. The one or more non-transitory computer-readable media store computer-executable instructions that, when executed by one or more processors of a computing system, cause the computing system to receive a contact record, generated by a contact center platform, associated with a first contact with a first representative of a contact center. The contact record is associated with a first contact identifier and includes a first transcript of the first contact. The computer-executable instructions also cause the computing system to determine that the contact record indicates a second contact identifier of a second contact, with a second representative of the contact center, that occurred before or after the first contact during a contact chain. The computer-executable instructions further cause the computing system to enrich the contact record with transfer data associated with the contact chain. The transfer data includes a contact sequence indicating an order of the first contact identifier of the first contact and the second contact identifier of the second contact. The contact sequence, in the transfer data in the contact record, causes a user interface of the contact center platform to, in response to a user accessing the contact record, display a timeline of the first contact and the second contact. The timeline presents the first transcript of the first contact stored in the contact record and a second transcript of the second contact, identified by the second contact identifier, stored in a second contact record.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 shows an example of a set of contact records, associated with a contact chain for a customer journey, that have been enriched with transfer data indicating information about the contact chain.

FIG. 3 shows an example of a view of a contact record in a user interface of the contact center platform.

DETAILED DESCRIPTION

Figure 1:
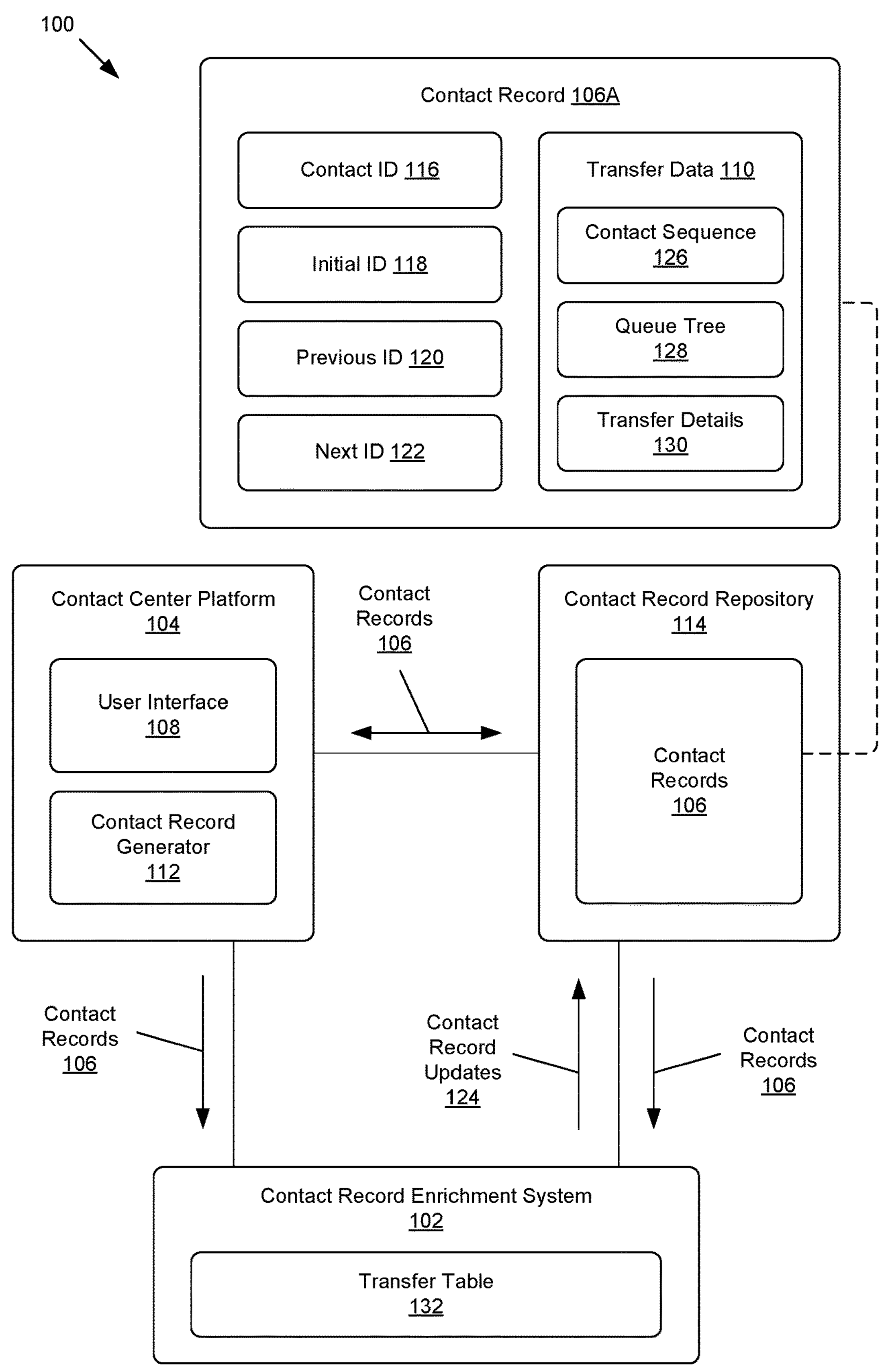
FIG. 1 shows an example of a contact record enrichment system associated with a contact center platform.

FIG. 1 shows an example 100 of a contact record enrichment system 102 associated with a contact center platform 104. The contact center platform 104 can be a computer-implemented platform used by, and/or within, a contact center. The contact center can be associated with entity, such as a business or other organization. The contact center can be staffed with representatives who engage in contacts with customers of the entity. As used herein, the term “customers” can refer to current customers of the entity, potential customers of the entity, current and/or prospective members of the entity, and/or any other individuals who may contact representatives at the contact center and/or who may be contacted by representatives at the contact center. The contacts between representatives and customers can include voice calls, video calls, emails, chat sessions, text messages, and/or other types of communications. The contact center platform 104 can generate contact records 106 corresponding to respective individual contacts handled via the contact center platform 104. A user interface 108 of the contact center platform 104 can display information about contacts based on corresponding contact records 106, as discussed further below.

In some situations, a representative may resolve a customer’s issue during an initial contact with the contact center. Accordingly, the customer’s “journey” through the contact center may involve a single contact, and the contact center platform 104 can generate a single contact record associated with that single contact.

However, in other situations, a customer may be transferred between different representatives one or more times, and/or the same representative may have multiple contacts with the customer, before the customer’s issue is resolved. Accordingly, in these situations, the customer’s “journey” through the contact center may include multiple contacts within a shared contact chain. For instance, a customer may be transferred twice before the customer’s issue is resolved, such that the customer’s journey includes a first contact with a first representative, a first transfer, a second contact with a second representative, a second transfer, and a third contact with a third representative. The contact center platform 104 can generate distinct contact records 106 associated with each of these multiple contacts within the contact chain associated with the customer journey.

In some examples, a customer’s journey may involve other types of transitions and/or activity instead of, or in addition to, transfers between contacts. As an example, a contact with a customer may end with a representative promising to research an issue and then call the customer back at a later time. Similarly, a contact may involve a customer leaving a message requesting a callback from a representative. In these examples, when a representative does call the customer back, the callback can be considered a new contact with the customer that is distinct from one or more previous contacts in the same customer journey. However, the contacts associated with the same customer journey may be considered to be part of the same contact chain, even if periods of time separate sequential contacts within the contact chain due to callbacks, messages, or other reasons.

In some examples, a pending callback that has not yet occurred can also be considered to be a contact that is then completed when the callback occurs, and the contact center platform 104 can generate a contact record associated with the pending callback. Similarly, in some examples any tasks that representatives are scheduled or assigned to perform between other contacts with a customer, such as a research task or other type of task that is to be performed before a representative next communicates with a customer as part of a customer journey, can be considered to be a contact within the contact chain associated with the customer journey and can be associated with a corresponding contact record.

As an example, a representative may engage in a first contact with a customer, and the representative or a different representative may perform some after-contact work following completion of the first contact. A representative may later engage in a second contact with the customer, for instance based on results of the after-contact work. In this example, the first contact, the after-contact work, and/or the second contact may be considered to be distinct contacts within a contact chain for a customer journey.

As another example, a contact with a customer may be a chat session between a customer and a representative that involves the exchange of text chat messages via a chat client. During the chat session, the customer and the representative may determine that speaking to each over verbally would be more productive than communicating via text chat messages, and the customer and the representative may end the chat session and begin a voice call to continue communications. In this example, the chat session can be considered one contact in a contact chain associated with a customer journey, and the subsequent voice call can be considered another contact in the same contact chain associated with the customer journey.

If a particular customer journey involves a chain of multiple contacts as described above, the contact record enrichment system 102 can be configured to add transfer data 110 to the contact records 106 that are associated with the multiple contacts in the contact chain associated with the customer journey. The transfer data 110 can indicate one or more types of information about the contact chain and/or the associated customer journey. For example, the transfer data 110 can indicate a sequence of the contacts associated with the customer journey, indicate an overall number of contacts associated with the customer journey, indicate a number of transfers associated with the customer journey, indicate types of transfers and/or contacts within the customer journey, indicate queue information about queues within the contact center that correspond to the contacts associated with the customer journey, and/or indicate other information about the customer journey. The contact record enrichment system 102 can add transfer data 110 to all of the contact records 106 that are associated with the same contact chain for a customer journey. Accordingly, individual contact records 106 associated with corresponding contacts within a contact chain for a customer journey can be enriched with information about preceding and/or subsequent contacts in the contact chain for the overall customer journey.

As an example, if a contact chain for a customer journey includes three transfers and four distinct contacts, a first contact record associated with the first contact in the contact chain can be enriched with transfer data 110 indicating information about the full customer journey that includes the first contact, the second contact, the third contact, and the fourth contact. Accordingly, a user who accesses the first contact record via the user interface 108 can view information about the first contact based on the first contact record, as well as information based on the transfer data 110 in the first contact record about the second, third, and fourth contacts that occurred in the contact chain after the first contact. The other contact records 106 associated with other contacts in the same customer journey can also be enriched with the transfer data 110. For instance, a user who accesses a fourth contact record associated with a fourth contact in the contact chain for the customer journey via the user interface 108 can view information about the fourth contact based on the fourth contact record, as well as information based on the transfer data 110 in the fourth contact record about the first, second, and third contacts that occurred in the contact chain before the fourth contact.

The contact center platform 104 can have a contact record generator 112 that generates the contact records 106. The contact record generator 112 may be configured to output generated contact records 106 upon completion of corresponding contacts. In some examples, the contact record generator 112 may generate initial versions of contact records 106 associated with contacts upon initiation of those contacts via the contact center platform 104, but may wait to output the contact records 106 until the contacts have been completed. For example, the user interface 108 may have a user-selectable option that a representative can select when the representative is finished with a contact, such that selection of the user-selectable option by the representative triggers the contact record generator 112 to output the corresponding contact record for the completed contact.

The contact center platform 104 can output generated contact records 106 to a contact record repository 114 that is configured to store the contact records 106. The contact record repository 114 can be a database, directory, memory location, or other data repository. In some examples, the contact record repository 114 may be separate and/or remote from the contact center platform 104, and the contact center platform 104 can send generated contact records 106 to the contact record repository 114 via one or more networks. In other examples, the contact record repository 114 can be a local and/or integrated element of the contact center platform 104. The contact center platform 104 can be configured to access copies of previously-generated contact records 106 from the contact record repository 114. For example, a user of the contact center platform 104 may use the user interface 108 to select a particular contact, and the contact center platform 104 may retrieve and/or access a copy of a contact record corresponding to the selected contact from the contact record repository 114 such that the user interface 108 can display information based on the contact record.

The contact center platform 104 can also provide generated contact records 106 to one or more consumers of contact records 106, including the contact record enrichment system 102. For example, the contact record enrichment system 102 can use an application programming interface (API) or other feature of the contact center platform 104 to subscribe to, and/or access, a data stream of new contact records 106 generated and output by the contact center platform 104. In other examples, the contact record enrichment system 102 can receive individual contact records 106, and/or batches of contact records 106, from the contact center platform 104 periodically, on-demand, or on any other scheduled or unscheduled basis. In some examples, the contact record enrichment system 102 can also, or alternately, scan the contact record repository 114 to identify and access new contact records 106 that have been added to the contact record repository 114 by the contact center platform 104.

Figure 5:
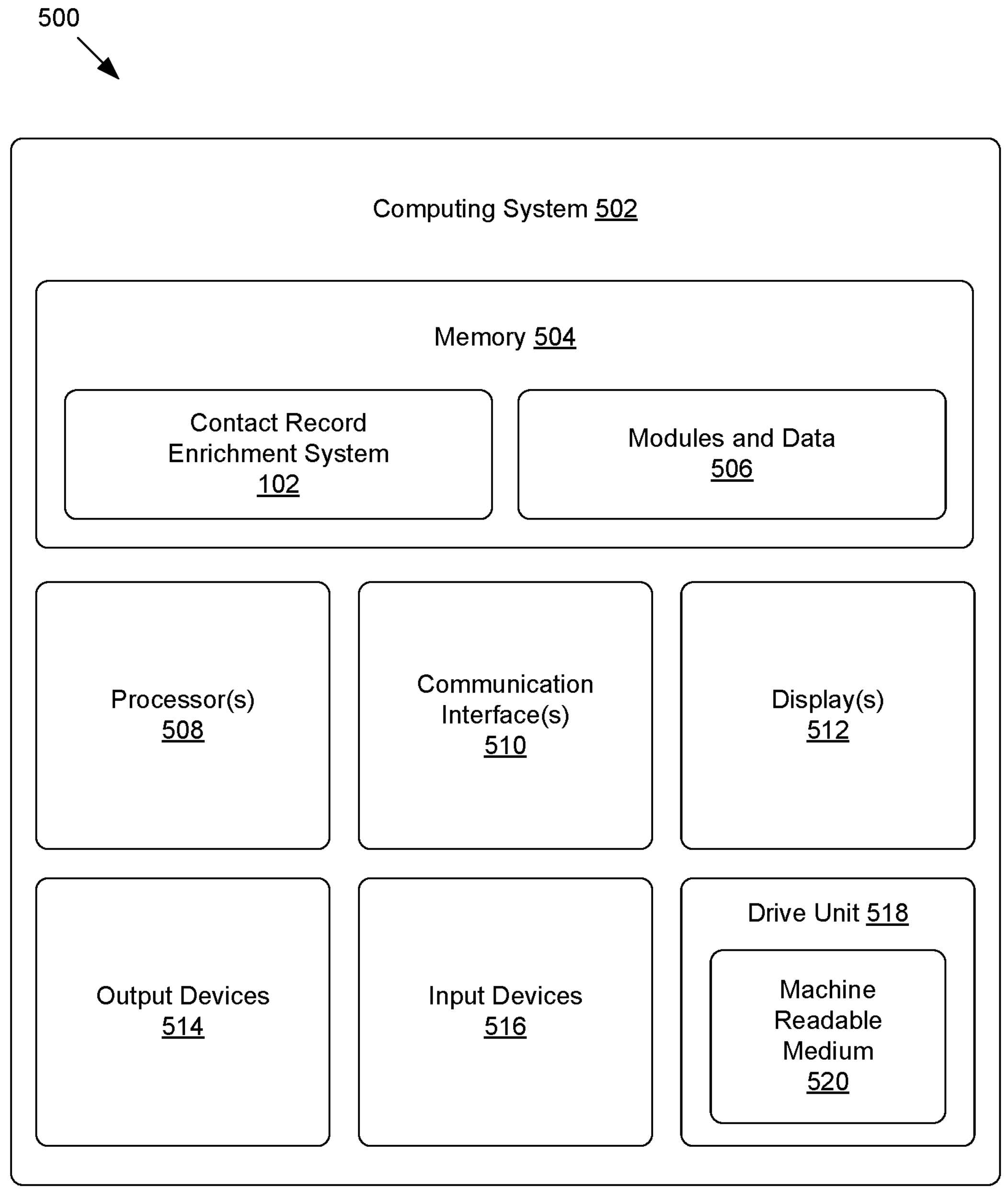
FIG. 5 shows an example system architecture for a computing system that can execute one or more elements of the contact record enrichment system.

The contact record enrichment system 102 can be a computer-implemented system that executes on one or more computing systems. An example architecture for such a computing system is shown in FIG. 5, and is discussed further below with respect to that figure. In some examples, the contact record enrichment system 102 may be separate and/or remote from the contact center platform 104 and/or the contact record repository 114. For example, the contact record enrichment system 102 may execute via a different computing system than one or more computing systems that execute the contact center platform 104 and/or that host the contact record repository 114. In these examples, the contact record enrichment system 102 can receive contact records 106 from the contact center platform 104 and/or the contact record repository 114, and/or update contact records 106 stored in the contact record repository 114, via one or more networks. In other examples, the contact record enrichment system 102 may execute via the same computing system that executes the contact center platform 104 and/or hosts the contact record repository 114, such that the contact record enrichment system 102 can be a local and/or integrated element of the contact center platform 104 and/or the contact record repository 114.

The contact records 106 generated by the contact record generator 112 of the contact center platform 104, which can be stored in the contact record repository 114 and/or can be processed by the contact record enrichment system 102 as described further below, can indicate one or more types of information about corresponding contacts. For example, contact records 106 generated by the contact center platform 104 to represent corresponding contacts can indicate start times of the contacts, end times of the contacts, identifiers of representatives associated with the contacts, identifiers of queues associated with the representatives and/or the contacts, initiation methods associated with the contacts, and/or other data.

In some examples, the contact records 106 generated by the contact record generator 112 may also or alternately indicate types of the corresponding contacts. For example, contact records 106 may indicate that respective corresponding contacts were voice calls, video calls, emails, chat sessions, text messages, and/or other types of communications.

In some examples, the contact records 106 generated by the contact record generator 112 may also, or alternately, include transcripts associated with the corresponding contacts. If contacts are voice calls or other types of contacts that are based at least in part on audio data, speech-to-text software and/or other transcription software associated with the contact center platform 104 may automatically convert the audio data associated with the contacts to text transcriptions in real-time during the contacts and/or at later times based on recordings of the contacts. If contacts are chat sessions, text messages, or other text-based contacts, the contact center platform 104 may store text data associated with the contacts as transcriptions. The contact record generator 112 and/or other elements of the contact center platform 104 can accordingly add such transcript data associated with individual contacts to corresponding contact records 106.

As shown in FIG. 1, the contact records 106 that are initially generated and/or output by the contact center platform 104 can each indicate one or more of a contact identifier (ID) 116, an initial ID 118, a previous ID 120, or a next ID 122. For example, FIG. 1 shows a contact record 106A that was initially generated by the contact record generator 112 of the contact center platform 104, and was stored in the contact record repository 114. Contact record 106A includes instances of the contact ID 116, the initial ID 118, the previous ID 120, and the next ID 122 that are associated with a particular contact represented by contact record 106A.

The contact ID 116 of a particular contact record can be a unique identifier assigned by the contact center platform 104 to the contact that is represented by that particular contact record. Accordingly, each of the contact records 106 can have a distinct and unique contact ID 116.

The initial ID 118 of a particular contact record can be the contact ID 116 associated with the first contact within a contact chain for a corresponding customer journey. As an example, if a customer journey begins with a first contact associated with a contact ID of "72739223," and the customer journey involves one or more transfers, contact records 106 for subsequent contacts in the contact chain for the customer journey can have instances of the initial ID 118 that indicate the "72739223" contact ID of the first contact. In this example, the contact record for the first contact within the corresponding customer journey may have a value of "72739223" in fields for both the contact ID 116 and the initial ID 118, or may have a value of "72739223" for the contact ID 116 and leave a field for the initial ID 118 blank.

The previous ID 120 of a particular contact record associated with a particular contact can be the contact ID 116 of an immediately-preceding contact in a contact chain for a customer journey, if the contact chain includes such an immediately-preceding contact. If a contact record represents the first contact in a customer journey, such that there is no immediately-preceding contact in the contact chain for the customer journey, the previous ID 120 of the contact record can be blank. However, if a particular contact record represents a contact that was initiated by a transfer from an immediately-preceding contact in a contact chain for a customer journey, or is otherwise linked to an immediately-preceding contact in a contact chain for a customer journey, the previous ID 120 of the contact record can indicate the contact ID 116 of the immediately-preceding contact in the contact chain for the customer journey.

As an example, if a third contact in a contact chain for a customer journey has a contact ID of "98235625," and a customer was transferred from the third contact to a fourth contact during the customer journey, the previous ID 120 in the contact record for the fourth contact can be "98235625" to indicate that the fourth contact was transferred from the immediately-preceding third contact that has the contact ID of "98235625." In this example, the contact record for the fourth contact may also have the initial ID 118 of the first contact in the contact chain for the customer journey. However, although the contact record for the fourth contact may include the identifier of the first contact in the contact chain for the customer journey via the initial ID 118, the identifier of the immediately-preceding third contact in the contact chain for the customer journey via the previous ID 120, and the identifier of the fourth contact itself via the contact ID 116, the contact record for the fourth contact may not natively or initially include any information about the second contact in the contact chain for the customer journey when the contact record for the fourth contact is generated and/or output by the contact center platform 104.

The next ID 122 of a particular contact record associated with a particular contact can be the contact ID 116 of an immediately-subsequent contact in a contact chain for a customer journey, if the contact chain for the customer journey includes such an immediately-subsequent contact. If a contact record represents the last contact in the contact chain for a customer journey, such as a contact in which the customer's issue was resolved and the customer was not subsequently transferred to another representative, the next ID 122 of the contact record can be blank. However, if a particular contact record represents a contact that initiated a transfer to an immediately-subsequent contact in a contact chain for a customer journey, or is otherwise linked to an immediately-subsequent contact in a contact chain for a customer journey, the next ID 122 of the contact record can indicate the contact ID 116 of the immediately-subsequent contact in the contact chain.

As an example, if a second contact in a contact chain for a customer journey has a contact ID of "89246853," and a customer is transferred from the second contact to a third contact that has a contact ID of "98235625," the next ID 122 in the contact record for the second contact can be "98235625" to indicate that the second contact was transferred to the immediately-subsequent third contact that has the contact ID of "98235625." In this example, the contact record for the second contact in the contact chain may also have an identifier of the first contact in the contact chain via the initial ID 118 and/or the previous ID 120. However, although the contact record for the second contact may include the identifier of the first contact in the contact chain via the initial ID 118 and/or the previous ID 120, the identifier of the second contact itself via the contact ID 116, and the identifier of the immediately-subsequent third contact in the contact chain via the next ID 122, when the contact record for the second contact is generated and/or output by the contact center platform 104, the contact record may not natively or initially include any information about any subsequent contacts that may occur after the third contact in the contact chain for the customer journey, such as a fourth contact, a fifth contact, and/or any additional subsequent contacts that occur during the customer journey.

In some examples, the contact center platform 104 can generate the contact ID 116 of an immediately-subsequent contact upon initiation of a transfer from a current contact. Accordingly, the contact center platform 104 can add the contact ID 116 of the immediately-subsequent contact as the next ID 122 in the contact record for the current contact. However, the contact center platform 104 may be configured to wait to output the contact record for the immediately-subsequent contact until the immediately-subsequent contact has been completed.

As discussed above, the previous ID 120 and/or next ID 122 provided in a particular contact record may link the corresponding contact to an immediately-preceding and/or an immediately-subsequent contact in a contact chain for a customer journey. The initial ID 118 provided in the contact record may also link the corresponding contact to an initial contact in the contact chain for the customer journey. However, other details about the overall customer journey and/or the overall contact chain may not be apparent from the initial ID 118, the previous ID 120, and/or the next ID 122 that are natively and initially provided within the contact record generated by the contact center platform 104.

For example, although the previous ID 120 of a contact record for a contact may link the contact record to an immediately-preceding contact in the same customer journey, it may not be apparent from the contact record how many other preceding contacts were also in a contact chain for the customer journey prior to the immediately-preceding contact, and the contact record may lack identifiers of such other preceding contacts in the contact chain. Similarly, although the next ID 122 of a contact record for a contact may link the contact record to an immediately-subsequent contact in the same customer journey, it may not be apparent from the contact record how many other subsequent contacts occurred during the contact chain for the customer journey after the immediately-subsequent contact, and the contact record may lack identifiers of such other subsequent contacts in the contact chain.

However, as described herein, the contact record enrichment system 102 can generate contact record updates 124 that cause contact records 106 in the contact record repository 114 to be updated and enriched with transfer data 110 about contact chains for customer journeys, in addition to and/or beyond identifiers of immediately-preceding and/or immediately-subsequent contacts. The transfer data 110 added to contact records 106 associated with the same customer journey can include a contact sequence 126, a queue tree 128 associated with the contact chain for the overall customer journey, and/or transfer details 130 indicating additional information about transfers associated with the contact records 106. Examples of transfer data 110 added to contact records 106, including instances of the contact sequence 126, the queue tree 128, and transfer details 130, are shown in FIG. 2, and are discussed further below with respect to that figure.

The contact sequence 126 in the transfer data 110 added to a contact record can indicate, in an ordered sequence, the contact ID 116 of each contact in a contact chain associated with an overall customer journey. For example, if an overall customer journey includes a contact chain of five contacts, the contact sequence 126 added to each of the separate contact records 106 associated with the customer journey can indicate an ordered sequence of the contact ID 116 of the first contact, the contact ID 116 of the second contact, the contact ID 116 of the third contact, the contact ID 116 of the fourth contact, and the contact ID 116 of the fifth contact. Accordingly, each of the individual contact records 106 associated with the customer journey can be enriched with the contact sequence 126 of the contact chain for the entire customer journey, such that the contact records 106 associated with individual respective contacts within the customer journey can each be enriched to indicate the contact sequence 126 of the contact chain for the entire customer journey.

In some examples, the contact sequence 126 added to the contact records 106 may indicate an initiation method associated with each of the contacts listed in the ordered sequence of contacts. As an example, if the overall customer journey includes a contact chain of five contacts, the contact sequence 126 added to each of the contact records 106 associated with the customer journey may indicate that the first contact in the customer journey was initiated via an inbound contact from a customer, the second contact in the customer journey was initiated via a transfer from the first contact, the third contact in the customer journey was initiated via a transfer from the second contact, the fourth contact in the customer journey was initiated as a pending call-back after the third contact, and the fifth contact in the customer journey was initiated as the call-back following the fourth contact.

In some examples, the contact sequence 126 added to the contact records 106 may also or alternately indicate a count of the total number of transfers during the customer journey, a total number of contacts associated with the customer journey, and/or other counts. For instance, if the overall customer journey includes a contact chain of five contacts and involved four transfers, the contact sequence 126 added to each of the contact records 106 associated with the customer journey can indicate that four transfers occurred during in the customer journey.

The same contact sequence 126 can be added to each of the contact records 106 associated with the same customer journey. For example, if a customer journey includes a contact chain of three contacts, the same contact sequence 126 can be added to corresponding contact records 106 for all three contacts. Accordingly, the contact sequence 126 added to each of the three contact records 106 can indicate the same ordered sequence of the three contacts in the customer journey, the same count of the number of transfers during the customer journey, the same information about the initiation method for each of the three contacts, and/or other data associated with the overall customer journey.

Accordingly, because the same contact sequence 126 can be added to each of the contact records 106 associated with the same customer journey, a user who accesses any of the individual contact records 106 via the user interface 108 can access the same information about the overall customer journey. As an example, if a customer journey includes a contact chain of three contacts, and a user accesses a first contact record about the first contact in the customer journey, the contact sequence 126 added to the first contact record can allow the user interface 108 to display a timeline showing information about the first contact as well as information about the second contact and the third contact that occurred after the first contact during the customer journey. If the user instead accesses a third contact record about the third contact that occurred during the same customer journey, the contact sequence 126 added to the third contact record can similarly allow the user interface 108 to display the same timeline showing information about the first contact, the second contact, and the third contact that occurred during the customer journey. An example of such a timeline is shown in FIG. 3, and is discussed further below with respect to that figure.

For instance, because the contact sequence 126 added to a single contact record associated with a customer journey identifies all of the other individual contacts and/or corresponding contact records 106 associated with the same contact chain for a customer journey, information from any or all of those contact records 106 can be retrieved and displayed in the timeline or other portions of the user interface 108 when a user accesses that single contact record. As an example, a customer journey may include a contact chain of five contacts that are respectively represented by five distinct contact records 106. If a user accesses a third contact record for the third contact in the contact chain for the customer journey via the user interface 108, the contact sequence 126 added to the third contact record can identify the set of five contact records associated with the contact chain for the customer journey. Accordingly, transcripts, representative names, times, and/or other data associated with the five individual contacts can be retrieved from the five contact records 106, such that information about the entire contact chain and/or customer journey can be displayed cohesively together in the user interface 108 when the user accesses the third contact record for the third contact in the contact chain.

The transfer data 110 added to contact records 106 associated with a contact chain for a customer journey can also include a queue tree 128 associated with the customer journey. Contacts, and/or representatives who handle contacts, can be associated with queues within the contact center. In some examples, representatives within a particular department or group within the contact center can be associated with a corresponding queue, such that any representative associated with that queue can be eligible to handle contacts within that queue. For instance, inbound calls to the contact center may be placed in a particular queue, such that any representative associated with that particular queue may answer pending inbound calls in that queue. In other examples, queues can be associated with individual representatives or other subsets of representatives.

In some examples, a contact chain for a customer journey may involve transferring a customer from one queue to another queue. For instance, a first representative associated with a first queue may handle an initial contact with a customer, but determine that a representative in a second department associated with a second queue may be more equipped to resolve the customer's issue. Accordingly, the first representative may transfer the customer to the second department, such that the next contact in the contact chain for the customer's journey is associated with the second queue of the second department.

In some examples, the contact ID 116 of a contact record may uniquely identify the contact record, but may not directly indicate which queue was associated with the corresponding contact. Similarly, the initial ID 118, previous ID 120, and/or next ID 122 of a contact record for a contact may not indicate, respectively, which queues were associated with an initial contact, an immediately-preceding contact, and/or an immediately-subsequent contact in a contact chain for a customer journey.

However, the queue tree 128 added to the contact record for a contact can identify which queues are associated with the contact and/or other contacts in a contact chain for a corresponding customer journey. In some examples, the queue tree 128 added to a contact record for a particular contact can indicate identifiers of queues associated with the particular contact, an initial contact in a contact chain for a customer journey, an immediately-preceding contact in the contact chain for the customer journey, and/or an immediately-subsequent contact in the contact chain for the customer journey. In other examples, the queue tree 128 added to a contact record for a particular contact can indicate a sequence of identifiers of queues associated with a full sequence of contacts within a contact chain associated with the customer journey.

In some examples, the queue tree 128 added to a contact record may also indicate whether the corresponding contact was initiated via a transfer from one queue to another queue, or was initiated as a transfer within the same queue. For example, if a first representative in a department associated with a particular queue transferred a customer to a second representative in the same department who is associated with the same particular queue, the queue tree 128 added to the contact record associated with the second contact handled by the second representative can indicate that the second contact was initiated via a transfer within the same queue.

Although the contact sequence 126 added to each of a set of contact records 106 associated with the same contact chain for a customer journey can be identical as discussed above, in some examples a different version of the queue tree 128 can be added to different contact records 106 that are associated with the same contact chain for a customer journey. For example, a first contact record for a first contact in a customer journey may be enriched with a first version of the queue tree 128 that is specific to the first contact and indicates queue identifiers of queues associated with the first contact and a subsequent second contact in a contact chain. However, a second contact record for the second contact in the same contact chain may be enriched with a second version of the queue tree 128 that is specific to the second contact in the contact chain. For instance, the queue tree 128 added to the second contact in the contact chain may indicate queue identifiers of queues associated with the initial and/or immediately-preceding first contact in the contact chain, the second contact in the contact chain, and an immediately-subsequent third contact in the contact chain. In other examples, the queue tree 128 added to each of a set of contact records 106 associated with the same contact chain for a customer journey can be identical. For example, all of the contact records 106 associated with the same contact chain for a particular customer journey can be enriched with a queue tree 128 indicating an ordered sequence of queue identifiers of queues associated with all of the contacts in the contact chain.

The transfer data 110 added to contact records 106 may also include transfer details 130 about transfers to or from the contacts represented by the contact records 106. Although as noted above the contact records 106 provided by the contact center platform 104 may natively indicate some information about transfers to and/or from the contacts represented by the contact records 106, for instance via the previous ID 120 and/or next ID 122 natively included in the contact records 106, the transfer details 130 may indicate additional information about the transfers beyond identifiers of the preceding and/or next contacts. For example, transfer details 130 added to a contact record 106 by the contact record enrichment system 102 may indicate details about a transfer away from a corresponding contact, such as the next ID 122 of the contact to which the contact was transferred, a duration of the transfer, a duration of after-contact work associated with the transfer, and/or other information.

Transfer details 130 about a transfer, added to a corresponding contact record 106, may directly or indirectly indicate a type of the transfer, for instance by indicating whether the transfer was a warm transfer, a cold transfer, a consult transfer, or other type of transfer. As an example, if the transfer details 130 indicate that a duration of the transfer was less than a threshold period of time, the transfer details 130 may indicate that the transfer was a cold transfer. However, if the transfer details 130 indicate that the duration of the transfer was more than a threshold period of time, the transfer details 130 may indicate that the transfer was a warm transfer during which a representative stayed engaged with the contact during and/or after the transfer, for instance to introduce the customer or the customer's issue to a second representative handling the next contact in the contact chain.

As discussed above, the contact records 106 can lack transfer data 110 when the contact records 106 are initially generated and/or output by the contact center platform 104, and/or are initially stored in the contact record repository 114. However, the contact record enrichment system 102 can receive copies of the contact records 106 from the contact center platform 104 and/or the contact record repository 114, and determine whether to add transfer data 110 to individual contact records 106. Additionally, after transfer data 110 has been added to a particular contact record associated with a contact chain for a customer journey by the contact record enrichment system 102, the contact record enrichment system 102 may later update the transfer data 110 in that particular contact record as the contact chain for the customer journey continues over time, and/or as additional contact records 106 associated with contacts in the contact chain for the customer journey are received by the contact record enrichment system 102.

The contact record enrichment system 102 can evaluate individual contact records 106 to determine whether the contact records 106 are associated with contacts in contract chains for larger customer journeys. If the contact record enrichment system 102 determines that a contact record for a contact is associated with a contact chain for a larger customer journey, the contact record enrichment system 102 can also determine that transfer data 110 is to be added to, or updated in, the contact record. The contact record enrichment system 102 can be configured to determine that a contact record for a contact is associated with a contact chain for a larger customer journey if at least one of the initial ID 118, the previous ID 120, and/or the next ID 122 of the contact record indicates that the contact is linked to at least one other contact that preceded or followed the contact in a contact chain.

As an example, if a customer's issue was resolved in a single contact, such that the contact is not part of a contact chain for a larger customer journey, the previous ID 120 and the next ID 122 in the corresponding contact record can be blank. The contact ID 116 in the contact record may also be the same as the initial ID 118, and/or the initial ID 118 can be blank. Based on the previous ID 120 and the next ID 122 in the contact record being blank, and/or the initial ID 118 being blank or the same as the contact ID 116 in the contact record, the contact record enrichment system 102 can determine that the contact represented by the contact record is not part of a larger customer journey. In this example, by determining that the contact is not part of a larger customer journey, the contact record enrichment system 102 can also determine not to add transfer data 110 to the corresponding contact record.

However, as another example, if the previous ID 120 in a contact record is not blank, and/or the initial ID 118 is not blank and is different from the contact ID 116 in the contact record, the contact record enrichment system 102 can determine that the contact represented by the contact record originated via a transfer from a preceding contact and is therefore part of a contact chain for a larger customer journey. Similarly, as yet another example, if the next ID 122 in a contact record is not blank, the contact record enrichment system 102 can determine that the contact represented by the contact record ended with a transfer to a subsequent contact, and that the contact is therefore part of a contact chain for a larger customer journey. In these examples in which the contact record enrichment system 102 determines that a contact represented by a contact record is part of a contact chain for a larger customer journey, the contact record enrichment system 102 can accordingly determine to add transfer data 110 to the contact record, and/or to update transfer data 110 previously added to the contact record.

The contact record enrichment system 102 can maintain a transfer table 132 that stores information about contact chains and/or corresponding customer journeys. The transfer table 132 can be a database, directory, memory location, or other data repository that stores information about contact chains and/or corresponding customer journeys. In some examples, the transfer table 132 can store the same or similar types of information about contact chains and/or corresponding customer journeys as the transfer data 110 that can be added to contact records 106. For example, the transfer table 132 can have entries associated with customer journeys that store sequences of contact IDs associated with contact chains for the customer journeys, counts of transfers between contacts within the contact chains for the customer journeys, counts of the number of contacts in the contact chains for the customer journeys, queue identifiers and/or other information about queues associated with contacts within the contact chains for the customer journeys, and/or other information associated with the contact chains for the customer journeys. In other examples, the transfer table 132 can also, or alternately, store copies of sets of contact records 106 that are associated with contacts in contact chains for customer journeys.

When the contact record enrichment system 102 determines that a particular contact record is associated with a contact chain for a customer journey as discussed above, the contact record enrichment system 102 may attempt to locate an existing entry for the contact chain and/or the customer journey in the transfer table 132, for instance by searching for an entry that references at least one of the contact ID 116, the initial ID 118, the previous ID 120, or the next ID 122 included in the particular contact record. If such an existing entry for the contact chain and/or the customer journey is found in the transfer table 132, the contact record enrichment system 102 may update the entry based on new information provided in the particular contact record. If an existing entry for the contact chain and/or the customer journey is not found in the transfer table 132, the contact record enrichment system 102 may add a such an entry to the transfer table 132 based at least in part on information included in the particular contact record.

Additionally, when the contact record enrichment system 102 determines that a particular contact record is associated with a contact chain for a customer journey, the contact record enrichment system 102 can also use information stored in a corresponding entry for the contact chain and/or the customer journey in the transfer table 132 to generate contact record updates 124 for one or more contact records 106 in the contact record repository 114 that are associated with the contact chain for the customer journey. The contact record enrichment system 102 can send the contact record updates 124 to the contact record repository 114, for instance via an API, one or more networks, and/or other interfaces or mechanisms. The contact record updates 124 can be configured to add transfer data 110 to one or more contact records 106 in the contact record repository 114 that are associated with the contact chain for the customer journey, and/or to update existing transfer data 110 in such contact records in the contact record repository 114.

In some examples, the contact record enrichment system 102 can be configured to add an entry associated with a particular customer journey, and/or a corresponding contact chain, to the transfer table 132 when the first contact record associated with the particular customer journey is identified. The contact record enrichment system 102 may also add corresponding transfer data 110 to that first contact record.

However, in other examples, the contact record enrichment system 102 can be configured to add an entry associated with a particular customer journey, and/or a corresponding contact chain, to the transfer table 132 when the first contact record associated with the particular customer journey is identified, but wait to add transfer data 110 to the first contact record until a second contact record associated with the same particular customer journey is identified. For instance, when the first contact record associated with a customer journey is identified, the contact record enrichment system 102 may add a corresponding entry to the transfer table 132 but may avoid adding transfer data 110 to the first contact record. When a second contact record associated with the same customer journey is identified, the contact record enrichment system 102 may update the corresponding entry in the transfer table 132 and add corresponding transfer data 110 to both the first contact record and the second contact record. If additional contact records 106 associated with the same customer journey are subsequently identified, the contact record enrichment system 102 may further update the corresponding entry in the transfer table 132, update transfer data 110 in previously-processed contact records 106, and add transfer data 110 to the additional contact records 106.

As an example, if a first contact record produced by the contact center platform 104 is associated with a first contact in a contact chain for a customer journey that involves a transfer from the first contact to a second contact, the next ID 122 of the first contact record can indicate the contact ID 116 of the second contact in the contact chain. The contact center platform 104 may have assigned the contact ID 116 of the second contact such that the contact ID 116 of the second contact can be used as the next ID 122 of the first contact record. However, the contact center platform 104 may not yet have output a second contact record for the second contact in the contact chain, for instance if the second contact is still in progress or a representative has not yet indicated via the user interface 108 that the second contact has completed. However, because the next ID 122 of the first contact record is not blank, the contact record enrichment system 102 can determine that the first contact record is associated with a contact chain for a larger customer journey as discussed above.

The contact record enrichment system 102 can, in this example, add an entry for the customer journey to the transfer table 132. The entry can indicate the contact ID 116 of the first contact in the contact chain associated with the customer journey. Although a second contact record for the second contact in the contact chain may not yet have been received by the contact record enrichment system 102, the entry added to the transfer table 132 can also indicate the contact ID 116 of the second contact in the contact chain, based on the next ID 122 provided in the first contact record. The contact record enrichment system 102 may also indicate other types of information in the added entry, such as a count indicating that one transfer is associated with the customer journey so far, an identifier of queues associated with the first contact and/or the second contact in the contact chain, and/or any other information.

When the contact center platform 104 outputs a second contact record associated with the second contact in the contact chain for the customer journey, the second contact record can indicate the contact ID 116 of the second contact in the contact chain, and the initial ID 118 and/or the previous ID 120 can indicate the contact ID 116 of the first contact in the contact chain associated with the customer journey. In some examples, the next ID 122 of the second contact record may also indicate that the second contact ended with a transfer to a third contact in the contact chain, and indicate the contact ID 116 of the third contact.

Accordingly, because in this example the transfer table 132 already has an entry for the customer journey that lists the contact ID 116 of the first contact and/or the contact ID 116 of the second contact that are referenced by the second contact record, the contact center platform 104 can update the entry in the transfer table 132 in response to receipt of the second contact record. For example, if the second contact record has a next ID 122 indicating a contact ID 116 of a third contact, to which the second contact was transferred, the contact record enrichment system 102 may add and/or update one or more types of information in the updated entry, such as by updating a transfer count to indicate that the customer journey is now associated with two transfers, update queue information with identifiers of queues associated with the second contact and/or the third contact in the contact chain, and/or any other information.

Additionally, the contact record enrichment system 102 can generate and send contact record updates 124 that adds transfer data 110 to copies of the first contact record and the second contact record stored in the contact record repository 114. The contact record enrichment system 102 can submit the contact record updates 124 to the contact record repository 114, for example via a communications link between the contact record enrichment system 102 and the contact record repository 114, via an API, or via another system or communication mechanism. The submitted contact record updates 124 can cause the transfer data 110 to be added to the copies of the first contact record and the second contact record in the contact record repository 114. For example, the transfer data 110 added to the first contact record in the contact record repository 114 can include an instance of the contact sequence 126 associated with the contact chain that indicates, in order, the contact ID 116 of the first contact, the contact ID 116 of the second contact, and the contact ID 116 of the third contact if the contact ID 116 of the third contact was identified by the second contact record. The transfer data 110 added to the first contact record in the contact record repository 114 can also include an instance of the queue tree 128 indicating queue information associated with the first contact and/or the second contact in the contact chain. The transfer data 110 added to the second contact record in the contact record repository 114 can also include a different instance of the queue tree 128 indicating queue information associated with the first contact, the second contact, and/or the third contact in the contact chain.

In this example, the copy of the first contact record that was added to the contact record repository 114 by the contact center platform 104 may have initially indicated the contact ID 116 of the second contact via the next ID 122 of the first contact record, but may not have indicated any information about the third contact in the contact chain for the customer journey that may not yet have occurred when the first contact record was generated by the contact center platform 104. However, as discussed above, the contact record enrichment system 102 can later enrich the copy of the first contact record stored in the contact record repository 114 with transfer data 110 that indicates information about the third contact in the customer journey, such as an instance of the contact sequence 126 that indicates contact IDs of the first contact, the second contact, and the third contact in the contact chain associated with the customer journey.

The contact record enrichment system 102 can similarly process any additional contact records 106 that are determined, based on instances of the initial ID 118, the previous ID 120, and/or the next ID 122, to be related to other contacts in the same customer journey. For example, when the contact record enrichment system 102 determines that a newly-received contact record for a contact indicates that the contact is part of a contact chain for a broader customer journey, based on information about that customer journey that is stored in the transfer table 132, the contact record enrichment system 102 can use information in the newly-received contact record to update a corresponding entry in the transfer table 132. The contact record enrichment system 102 can also generate and send contact record updates 124 that update and/or add transfer data 110 in contact records 106 for contacts in the customer journey that are stored within the contact record repository 114.

In some examples, contact records 106 associated with contacts in the same customer journey may be received by the contact record enrichment system 102 out of order relative to an order in which the contacts occur and/or are handled by representees. However, the contact record enrichment system 102 can nevertheless determine that contact records 106 received out of order are related to the same customer journey, and are part of the same contact chain, if individual contact records 106 reference contact IDs of other contacts that the transfer table 132 indicates are already known to be associated with the customer journey. Accordingly, the contact record enrichment system 102 can add and/or update transfer data 110 in contact records 106 in the contact record repository 114 based on information in contact records 106 that are received out of order.

As an example, if a customer journey includes a contact chain of four contacts, the contact record enrichment system 102 may receive a first contact record for the first contact in the customer journey at a first time after a first representative indicates via the user interface 108 that the first contact has concluded. The first contact may have concluded via a transfer to a second contact handled by a second representative. The second representative may conclude the second contact with a transfer to a third contact handled by a third representative, and the contact record enrichment system 102 may receive a second contact record for the second contact at a second time after the second representative indicates via the user interface 108 that the second contact has concluded. The contact record enrichment system 102 may add and/or update an entry in the transfer table 132 based on the first contact record and the second contact record, and can also enrich copies of the first contact record and the second contact record with transfer data 110.

In this example, the third representative may conclude the third contact with a transfer to a fourth contact handled by a fourth representative. The third representative may however forget to indicate via the user interface 108 that the third contact has concluded. In this situation, when the fourth representative concludes the fourth contact and indicates that the fourth contact has concluded via the user interface 108, the contact record enrichment system 102 may receive a fourth contact record for the fourth contact at a time at which the contact record enrichment system 102 has not yet have received a third contact record for the third contact.

However, because the initial ID 118 of the fourth contact record can match the contact ID 116 of the first contact record in this example, and/or the previous ID 120 of the fourth contact record can match the next ID 122 of the second contact record (both indicating the contact ID of the third contact in the contact chain), the contact record enrichment system 102 can determine that the fourth contact record is associated with the same contact chain and same customer journey as the first contact record and the second contact record. The contact record enrichment system 102 can accordingly update an entry for the customer journey in the transfer table 132, and/or add or update transfer data 110 in corresponding contact records 106 at the contact record repository 114, based on any new information about the customer journey provided in the fourth contact record.

For instance, in this example, the contact record enrichment system 102 may derive that the customer journey is associated with a sequence of the first contact, the second contact, the third contact, and the fourth contact, based on instances of the contact ID 116, the initial ID 118, the previous ID 120, and/or the next ID 122 provided within the first contact record, the second contact record, and the fourth contact record that have been received so far, even though a contact record for the third contact has not yet been received. The contact record enrichment system 102 can accordingly update information associated with the customer journey in the transfer table 132, and/or add or update corresponding transfer data 110 in contact records 106 in the contact record repository 114, for instance to indicate an updated contact sequence 126 that now includes the fourth contact, to update a count of a number of transfers based on the occurrence of the fourth contact, and/or to update any other information associated with the customer journey.

If and when the third representative later remembers to indicate via the user interface 108 that the third contact in the customer journey has concluded in this example, the contact record enrichment system 102 may receive a third contact record for the third contact. For instance, the third representative may realize hours after the actual conclusion of the third contact that the third contact has not been marked as concluded in the user interface 108, and may select an option to indicate that the third contact has been concluded. At this point, the contact record enrichment system 102 can receive the third contact record, and can update the entry for the customer journey with any new information provided in the third contact record. The contact record enrichment system 102 can also add transfer data 110 associated with the customer journey to the third contact record, for instance to indicate the full contact sequence 126 of contact IDs for the first contact, the second contact, the third contact, and the fourth contact in the contact chain for the customer journey. The contact record enrichment system 102 may also update transfer data 110 previously added to the contact records 106 for the first contact, the second contact, and the fourth contact in the contact chain for the customer journey based on any new information about the customer journey provided in the third contact record. Accordingly, all of the contact records 106 associated with the customer journey can ultimately be enriched with transfer data 110 about the overall customer journey, even if those contact records 106 arrive at the contact record enrichment system 102 in a different order than an order in which the corresponding contacts occurred during the customer journey.

As another example, a contact record 106 for a particular contact may indicate a previous ID 120 of a contact record 106 for a preceding contact in the contact chain. However, due a data stream error or a network issue, the contact record enrichment system 102 may not yet have received the contact record 106 for that preceding contact that is identified by the previous ID 120. However, the contact record enrichment system 102 may add a corresponding entry to the transfer table 132 based on receipt of the contact record 106 for the particular contact, and/or add transfer data 110 to the contact record 106 for the particular contact, based on information received so far by the contact record enrichment system 102. If and/or when the contact record enrichment system 102 does receive the other contact record 106 for the preceding contact in the contact chain that was identified by the previous ID 120, for instance after a data stream error or network issue has been resolved, the contact record enrichment system 102 may update the transfer table 132 and/or transfer data 110 added to the contact records 106 based on the later-received contact record 106 for the preceding contact.

In some examples, entries in the transfer table 132 can be stored temporarily by the contact record enrichment system 102, and individual entries may be deleted after a threshold period of time if no updates have been made to the entries. For example, the contact record enrichment system 102 may be configured to delete entries in the transfer table 132 that have not been updated for at least eight hours, or any other longer or shorter threshold period of time. However, although an entry for a customer journey may be deleted from the transfer table 132 after a threshold period of time, corresponding transfer data 110 associated with that customer journey can be stored and maintained for longer times in contact records 106 in the contact record repository 114 that are associated with the customer journey as discussed above. Accordingly, if the contact record enrichment system 102 determines that a newly-received contact record is associated with a customer journey, but no entry for that customer journey currently exists in the transfer table 132, the contact record enrichment system 102 can search the contact record repository 114 for contact records 106 with contact IDs that match at least one of the initial ID 118, the previous ID 120, or the next ID 122 provided in the newly-received contact record. If the contact record repository 114 includes at least one contact record with a contact ID that matches the initial ID 118, the previous ID 120, or the next ID 122 provided in the newly-received contact record, the contact record enrichment system 102 can use transfer data 110 about a customer journey that was previously added to the at least one contact record in the contact record repository 114 to recreate an entry for the customer journey in the transfer table 132.

As an example, a newly-received contact record for a contact may indicate contact IDs of one or more other contacts within a contact chain for the same customer journey, such as via the initial ID 118 and/or the previous ID 120 of the contact record. In this example, the contact may have been a callback or other type of contact that occurred a relatively long time after a preceding contact in the contact chain for the customer journey, such that an entry for the customer journey is no longer present in the transfer table. For instance, the contact record enrichment system 102 may search for an entry in the transfer table that lists one or more of the identifiers indicated in the newly-received contact record, but may not find such an entry in the transfer table 132 because the entry had not been updated for more than a threshold period of time and was deleted from the transfer table 132. However, in this situation, the contact record enrichment system 102 may search the contact record repository 114 for contact records 106 that reference one or more of the contact IDs associated with the contact chain for the customer journey in the original data provided by the contact center platform 104 and/or within transfer data 110 previously added to the contact records 106 by the contact record enrichment system 102.

For instance, based on the initial ID 118 of the newly-received contact record, the contact record enrichment system 102 can retrieve the contact record associated with the initial contact in the contact chain for the customer journey from the contact record repository 114. The contact record associated with the initial contact can have previously been enriched with transfer data 110 associated with the customer journey, including the contact sequence 126 associated with the contact chain for the customer journey and the queue tree 128 associated with the initial contact. The contact sequence 126 can be used to identify and/or retrieve any or all of the other contact records 106 associated with the contact chain for the customer journey, including instances of the queue tree 128 associated with other contacts in contact chain for the customer journey. The contact record enrichment system 102 can use the transfer data 110 and/or other data in the retrieved contact records 106 to recreate an entry for the customer journey in the transfer table 132, such that the entry can then be further updated based on new information in the newly-received contact record. The updated entry in the transfer table 132 can also be used to add new transfer data 110 to a copy of the newly-received contact record in the contact record repository 114, and/or to update existing transfer data 110 in the other contact records in the contact record repository 114 that are associated with the customer journey, as described above.

Overall, by enriching individual contact records 106 associated with individual contacts in a customer journey with transfer data 110 about the broader customer journey, the user interface 108 can display more information about the customer journey and/or a corresponding contact chain based on a single contact record than could be displayed without the added transfer data 110. For example, if a user uses the user interface 108 to access and view information about a single contact based on a corresponding single contact record, the transfer data 110 added to that single contact record may indicate that the single contact was the fourth contact in a contact chain for a broader customer journey that included six contacts overall. The contact sequence 126 in the transfer data 110 added to the single contact record can identify a sequence of contact IDs for six contact records 106 in the contact record repository 114 that correspond to the six contacts in the contact chain for the customer journey. The user interface 108 may be configured to display a timeline of all six of those contacts in the contact chain associated with the customer journey, based on the transfer data 110 that was added to the single contact record for the fourth contact and/or based on data stored within the six contact records identified by the transfer data 110 added to the single contact record.

Accordingly, although a user may select one contact via the user interface 108 in order to view information about the selected contact, the transfer data 110 added to the contact record that corresponds to the selected contact can allow the user interface 108 to display information about all of the contacts in a contact chain associated with the same customer journey. For instance, the user interface 108 can use transfer data 110 added to a contact record associated with a user-selected record to also display information about any contacts that occurred before the selected contact in a contact chain for the customer journey, and/or any contacts that occurred after the selected contact in the contact chain for the customer journey.

In some examples, information about a customer journey, based on added transfer data 110, can be displayed to a representative via the user interface 108 when the representative handles a new contact in the contact chain for the customer journey. For example, if a representative handles a fifth contact in a contact chain for a customer journey after a transfer from a fourth contact in the contact chain for the customer journey, the user interface 108 may be configured to present the representative with information about the fourth contact in the contact chain. However, because a contact record representing the fourth contact can have been enriched with transfer data 110 associated with the full customer journey, the representative can view information about the entire customer journey including the first contact, the second contact, the third contact, and the fourth contact in the contact chain when the representative views information about the fourth contact in the contact chain. Such information associated with the full contact chain and/or full customer journey, displayed in the user interface 108 based on the transfer data 110 added to the contact record representing the fourth contact, can indicate the contact sequence 126 associated with the customer journey, a count of a number of contacts and/or a count of a number of transfers during the customer journey, transcript information associated with all of the contacts within the customer journey, instances of the queue tree 128 associated with any or all of the contacts in the customer journey, and/or any other information associated with the customer journey.

Accordingly, as the representative is handling the fifth contact in this example, the representative can immediately be presented with information about the entire customer journey and the four preceding contacts in the associated contact chain via the user interface 108. The representative may thus be able to quickly understand the customer's issue and/or the context of the fifth contact within the overall customer journey, such that the customer can avoid repeating statements made during prior contacts in the customer journey and/or the representative can avoid looking up separate individual contact records for the previous contacts via the contact center platform 104.

In other examples, information about a customer journey, based on added transfer data 110, can be displayed to a user via the user interface 108 when the user accesses information about an older contact in the customer journey. For example, a manager that manages a group of representatives in the call center may want to review a particular contact to determine how a representative handled that contact, and/or how the handling of the contact impacted any subsequent contacts in the contact chain associated with the overall customer journey. Accordingly, the manager may use the user interface 108 to select a contact record for the particular contact, and the user interface 108 can use transfer data 110 added to the selected contact record to display information about the overall customer journey in association with the selected contact record. For instance, if the manager selects the first contact in a contact chain for a customer journey, the user interface 108 can use transfer data 110 added to the contact record for the selected first contact to display a timeline of the entire customer journey that includes information about three additional contacts that occurred in the contact chain after the first contact. The manager may, for example, be able to determine from the timeline which queues were associated with the later contacts in the customer journey, whether the representative who handled the first contact transferred the customer to another representative associated with the same queue or to another representative associated with a different queue, and/or any other information.

Accordingly, in these examples, by presenting information about the entire customer journey and/or the entire corresponding contact chain in the user interface 108 based on transfer data 110 added to a single contact record for a single contact in a customer journey, the user interface 108 can more efficiently present information about the customer journey relative to separately presenting disconnected information associated with different contacts in the customer journey. For example, the user interface 108 can display more information about the overall customer journey, and/or display the information about the overall customer journey concurrently in a single view or window, relative to displaying information about different contacts in multiple views and/or windows or at different times. The transfer data 110 added to the contact records 106 can thus allow the contact center platform 104 to present cohesive information about a chain of contacts associated with a customer journey in the user interface 108 at the same time, and thereby avoid using processing cycles, memory, network bandwidth, and/or other computing resources to separately access and/or process separate contact records 106 at separate times in order to display information about distinct contacts in the user interface 108 at different times and/or via different user interface views or windows.

Moreover, the transfer data 110 added to contact records 106 can be used by managers, analysts, analytics tools, and/or other entities to evaluate performances of individual representatives in the contact center, teams of representatives, and/or the contact center as a whole. In some examples, metrics and/or key performance indicators (KPIs) can be derived from transfer data 110 in association with corresponding customer journeys. The metrics and/or KPIs can include average numbers of transfers during customer journeys, maximum numbers of transfers during a set of customer journeys, trends of numbers of transfers during customer journeys over periods of time, numbers of incoming and/or outgoing transfers associated with particular representatives and/or queues, numbers of transfers that occurred within the same queues, numbers of transfers to and/or from individual queues over a period of time, numbers or percentages of contacts handled by individual representatives or queues, numbers of customer journeys that involved different types of contacts, numbers of customer journeys that involved callbacks or other particular types of contacts, durations of overall customer journeys, durations of individual contacts associated with larger customer journeys, durations of hold times associated with queues during one or more contacts associated with customer journeys, and/or any other types of metrics and/or KPIs.

Such metrics and/or KPIs can be displayed via the user interface 108 and/or other analytics tools. For instance, the user interface 108 and/or another analytics tool may include a dashboard that presents values for metrics and/or KPIs, visualizations of metrics and/or KPIs, and/or other information associated with metrics and/or KPIs.

As an example, the transfer data 110 added to contact records 106 can indicate how many transfers occurred during corresponding customer journeys. This information can be used to track the number of transfers that occur on average during customer journeys over time. Such information may be used to determine whether the contact center has been effective at routing customers to representatives who can resolve customer issues and thereby decreasing the average number of transfers, or whether the average number of transfers has been increasing such that contact routing procedures within the contact center should be revaluated and/or representatives should be trained more and/or differently.

As another example, the transfer data 110 added to contact records 106 associated with customer journeys can indicate numbers of transfers associated with individual representatives, or groups of representatives or corresponding queues, relative to other representatives, groups, and/or queues. Such metrics may indicate that a particular representative is transferring customers to other representatives at a higher-than-average rate, and thereby indicate that the particular representative may benefit from further training about how to handle customer issues. Similarly, if such metrics indicate that a particular representative in a department associated with a particular queue is transferring customers to other representatives in the same department who are associated with the same particular queue at a higher-than-average rate, the metrics may indicate that the particular representative would benefit from further training about how to handle customer issues that the department specializes in resolving.

As yet another example, the transfer data 110 may indicate that contact chains associated with numerous customer journeys began in association with a first queue, and/or passed through the first queue, and were transferred through other queues multiple times before ultimately being concluded at a different second queue. In this example, the transfer data 110 may indicate that customer issues could have been resolved more quickly, and with fewer transfers, if customers had been transferred directly from the first queue to the second queue. Accordingly, the transfer data 110 may indicate an opportunity to revise contact transfer procedures within the contact center to transfer contacts from the first queue to the second queue more often and/or more quickly, and thereby lowering the number of intervening transfers from the first queue to other queues.

Overall, as shown in FIG. 1, the contact record enrichment system 102 can receive contact records 106 generated by the contact center platform 104 in association with corresponding contacts. If the contact record enrichment system 102 determines that individual contact records 106 are associated with larger customer journeys that involve chains of multiple contacts, the contact record enrichment system 102 can enrich copies of the contact records 106 that are stored in the contact record repository 114 with transfer data 110 that indicates information associated with the contact chains of the larger customer journeys. Accordingly, when contact records 106 associated with individual contacts are accessed via the user interface 108 of the contact center platform 104, via analytics tools, and/or by other systems, the transfer data 110 added to contact records 106 for individual contacts within customer journeys can indicate broader information about the overall customer journeys in addition to information about the individual contacts. An example of transfer data 110 added to contact records 106 is discussed further below with respect to FIG. 2.

FIG. 2 shows an example 200 of a set of contact records 106, associated with a contact chain for a customer journey, that have been enriched with transfer data 110 indicating information about the contact chain. The set of contact records 106 can include a first contact record 202 representing a first contact in the contact chain for the customer journey, a second contact record 204 representing a second contact in the contact chain for the customer journey, and a third contact record 206 representing a third contact in the contact chain for the customer journey.

The contact ID 116 of each of the contact records 106 can uniquely identify the corresponding contact record and/or the contact represented by that contact record. For example, as shown in FIG. 2, the contact ID 116 of the first contact record 202 can be "contact_id1," the contact ID 116 of the second contact record 204 can be "contact_id2," and the contact ID 116 of the third contact record 206 can be "contact_id3."

The set of contact records 106 shown in FIG. 2 may be stored in the contact record repository 114. The contact record enrichment system 102 can have enriched the set of contact records 106 with transfer data 110 about the customer journey associated with the corresponding contacts. For example, the first contact record 202, the second contact record 204, and the third contact record 206 can each have transfer data 110 that include instances of the contact sequence 126 associated with the contact chain for the customer journey, and instances of the queue tree 128 associated with the corresponding contacts. In some examples, one or more of the contact records 106 may also be enriched with transfer details 130 about associated transfers, for example as shown with respect to the first contact record 202 in FIG. 2. Although not shown in FIG. 2, the second contact record 204, the third contact record 206, and/or other contact records 106 may also be enriched with transfer details 130 about transfers associated with the contacts that correspond to the contact records 106.

The contact sequence 126 added to each of the individual contacts records associated with the contact chain for the customer journey can indicate information about all of the contacts in the contact chain associated with the overall customer journey. For example, the contact sequence 126 added to the contact records 106 can indicate one or more of an initiation method sequence 208 associated with the customer journey, a transfer count 210 associated with the customer journey, a contact ID sequence 212 associated with the customer journey, and/or other information about the overall customer journey.

The instances of the contact sequence 126 added to the first contact record 202, the second contact record 204, and the third contact record 206 can be identical. For example, the contact sequence 126 in each of the first contact record 202, the second contact record 204, and the third contact record 206 can indicate the same initiation method sequence 208, the same transfer count 210, and/or the same contact ID sequence 212. Accordingly, when any one of the first contact record 202, the second contact record 204, or the third contact record 206 are accessed via the contact center platform 104, that one contact record for one of the contacts in the contact chain for the customer journey can indicate the same initiation method sequence 208, the same transfer count 210, and/or the same contact ID sequence 212 associated with the overall customer journey that includes the chain of multiple contacts.

The initiation method sequence 208 in the contact sequence 126 added to each of the contact records 106 can indicate how each of the contacts in the contact chain for the overall customer journey were initiated. For example, in FIG. 2 the initiation method sequence 208 can indicate that the first contact represented by the first contact record 202 was an initial inbound contact, that the second contact represented by the second contact record 204 was initiated via a transfer, and that the third contact represented by the third contact record 206 was initiated via a transfer.

The transfer count 210 in the contact in the contact sequence 126 added to each of the contact records can indicate how many transfers between contacts have occurred during the contact chain for the overall customer journey. For example, in FIG. 2 the transfer count 210 can be "2" to indicate that two transfers have occurred during the customer journey.

The contact ID sequence 212 in the contact sequence 126 added to each of the contact records 106 can indicate, in order, the contact IDs of each of the contacts in the contact chain for the overall customer journey. For example, in FIG. 2 the contact ID sequence 212 can indicate that the customer journey has involved an ordered sequence of contacts that began with the first contact associated with the contact ID 116 of "contact_id1," involved a transfer from the first contact to the second contact associated with the contact ID 116 of "contact_id2," and involved a transfer from the second contact to the third contact associated with the contact ID 116 of "contact_id3."

Although the instances of the contact sequence 126 added each of the contact records 106 associated with the customer journey can be identical, in some examples instances of the queue tree 128 added to different contact records 106 associated with the customer journey may differ. For example, instances of the queue tree 128 added to contact records 106 can include a current queue field 214 identifying a queue associated with the corresponding contact in the contact chain associated with a customer journey, a repeat contact ("rc") field 216 indicating whether the corresponding contact was initiated via a transfer from a preceding contact in the contact chain that was associated with the same queue as the corresponding contact, a previous queue field 218 identifying a queue associated with an immediately-preceding contact in the contact chain, a next queue field 220 identifying a queue associated with an immediately-subsequent contact in the contact chain, and an initial queue field 222 identifying a queue associated with the first contact in the contact chain. The values of the current queue field 214, the repeat contact field 216, the previous queue field 218, the next queue field 220, or the initial queue field 222 within the queue tree 128 added to each of the different contact records 106 can be specific to the corresponding contacts, such that values of one or more of the fields within different instances of the queue tree 128 added to different contact records 106 may vary.

As an example, the queue tree 128 added to the first contact record 202 for the first contact in the contact chain for the customer journey can indicate via the current queue field 214 that the first contact was associated with a first queue identified by "XXX_Q," indicate via the repeat contact field 216 that the first contact was not initiated via an intra-queue transfer, indicate via a blank null value of the previous queue field 218 that the first contact was not transferred from any preceding queue, indicate via the next queue field 220 that the first contact ended with a transfer to a second queue identified by "YYY_Q," and indicate via the initial queue field 222 that the initial contact in the customer journey (the first contact in the contact chain) was associated with the first queue identified by "XXX_Q."

As another example, the queue tree 128 added to the second contact record 204 for the second contact in the contact chain for the customer journey can indicate via the current queue field 214 that the second contact was associated with the second queue identified by "YYY_Q," indicate via the repeat contact field 216 that the second contact was not initiated via an intra-queue transfer, indicate via the previous queue field 218 that the second contact was initiated via a transfer from the first queue identified by "XXX_Q," indicate via the next queue field 220 that the second contact ended with a transfer to a third queue identified by "ZZZ_Q," and indicate via the initial queue field 222 that the initial contact in the customer journey (the first contact in the contact chain) was associated with the first queue identified by "XXX_Q."

As another example, the queue tree 128 added to the third contact record 206 for the third contact in the contact chain for the customer journey can indicate via the current queue field 214 that the third contact was associated with the third queue identified by "ZZZ_Q," indicate via the repeat contact field 216 that the third contact was not initiated via an intra-queue transfer, indicate via the previous queue field 218 that the third contact was initiated via a transfer from the second queue identified by "YYY_Q," indicate via a blank null value of the next queue field 220 that the third contact did not end with a transfer to any subsequent queue, and indicate via the initial queue field 222 that the initial contact in the customer journey (the first contact in the contact chain) was associated with the first queue identified by "XXX_Q."

Although instances of the queue tree 128 added to different contact records 106 representing different contacts in a contact chain for the same customer journey may differ in some examples as shown in FIG. 2, in other examples the queue tree 128 added to contact records 106 representing different contacts in a contact chain for the same customer journey may be identical. For example, instead of having the current queue field 214, the previous queue field 218, the next queue field 220, and the initial queue field 222, the queue tree 128 added to each of the first contact record 202, the second contact record 204, and the third contact record 206 may indicate an identical sequence of queues, similar to the contact ID sequence 212, associated with the customer journey, such as a sequence of the queue identifiers "XXX_Q," "YYY_Z," and "ZZZ_Q."

The contact record enrichment system 102 may add transfer details 130 about corresponding transfers to respective contact records 106, for example as shown with respect to the first contact record 202 in FIG. 2. The transfer details 130 added to the first contact record 202 may include an after-contact work (ACW) duration 224, an instance of the next ID 122 associated with the first contact record 202, a transfer duration 226, and/or other details about a corresponding transfer. The ACW duration 224 may indicate a duration of work performed by a representative following completion of the contact represented by the first contact record 202. The next ID 122 added to the transfer details 130 in the first contact record 202 may be the contact ID 116 of the second contact record 204, indicating that a transfer associated with the first contact record 202 transferred a customer to a second contact represented by the second contact record 204. The transfer duration 226 may indicate a duration between a time at which the transfer to the second contact occurred and a time at which the representative began after-contact work, if any, after that transfer. As shown in FIG. 2, the transfer duration 226 may be zero, such that the transfer may have been a cold transfer. However, if the transfer duration 226 is greater than zero and/or is longer than a threshold, the transfer duration 226 may indicate that a representative handling the first contact represented by the first contact record 202 stayed on the line with the customer for a corresponding amount of time and/or performed other after-contact work while the customer's journey continued with the second contact represented by the second contact record 204, and thus that the transfer was a warm transfer, a consult transfer, or other type of transfer. Although not shown in FIG. 2, similar transfer details 130 may also be added to other contact records 106, such as the second contact record 204 and the third contact record 206.

As discussed above, the contact record enrichment system 102 can add initial transfer data 110 to a contact record stored in the contact record repository 114 based on one or more initially-received contact records 106, and can later update the transfer data 110 in that contact record based on information provided in later-received contact records 106 associated with the same customer journey. For example, at a point in time before the third contact in a contact chain for a customer journey occurred, the contact record enrichment system 102 may have added an instance of the transfer data 110 to the first contact record 202 that indicated a version of the initiation method sequence 208 of "INBOUND, TRANSFER," a version of the transfer count 210 that indicated one transfer (from the first contact to the second contact in the contact chain) had occurred, and a version of the contact ID sequence 212 of "contact_id1, contact_id2."

However, after the third contact in the contact chain occurs and additional information about the third contact, and/or a transfer from the second contact to the third contact, is provided to the contact record enrichment system 102 via the second contact record 204 and/or the third contact record 206, the contact record enrichment system 102 can update the transfer data 110 in the first contact record 202. For instance, the contact record enrichment system 102 can update the transfer data 110 in the first contact record 202 to an updated version of the initiation method sequence 208 of "INBOUND, TRANSFER, TRANSFER," an updated version of the transfer count 210 that indicates two transfers (from the first contact to the second contact, and from the second contact to the third contact) have occurred, and an updated version of the contact ID sequence 212 of "contact_id1, contact_id2, contact_id3" as shown in FIG. 2.

The transfer data 110 added to each of the set of contact records 106 associated with the customer journey can be used to display, via the user interface 108, information about the customer journey and/or the corresponding contact chain when any single one of the contact records 106 is accessed via a user. An example of presenting information about a customer journey in the user interface 108, based on transfer data 110 added to a contact record, is discussed below with respect to FIG. 3.

FIG. 3 shows an example 300 of a view of a contact record in the user interface 108 of the contact center platform 104. The user interface 108 can allows users to select individual contact records 106 and/or corresponding contacts. The contact center platform 104 can access a user-selected contact record from the contact record repository 114, and use the contact record to display associated information within the user interface 108. In example 300 shown in FIG. 3, a user may have selected a particular contact that was the second contact in a contact chain for a customer journey.

As shown in FIG. 3, the user interface 108 can display contact details 302 about the selected contact based on the corresponding contact record. The contact details 302 can, for example, identify the representative that handled the selected contact, indicate a start time and/or end time of the selected contact, indicate how the selected contact was initiated, and/or indicate other information that is specifically about the selected contact.

However, because the contact record enrichment system 102 can have added transfer data 110 associated with the larger customer journey to the contact record that corresponds to the selected contact, the user interface 108 can also, or alternately, display customer journey details 304 about the larger customer journey based on the transfer data 110 in the contact record. The customer journey details 304 can, in some examples, be presented as a timeline of all of the contacts in the contact chain for the customer journey as shown in FIG. 1.

For example, although a user may have selected the second contact in the contact chain for the customer journey, the user interface 108 can display a timeline or other representation of customer journey details 304 based on the transfer data 110 in the contact record that corresponds to the selected second contact. For instance, the timeline can indicate that four contacts are within the contact chain associated with the customer journey, and can present contact IDs and initiation methods of the four contacts based on, respectively, the contact ID sequence 212 and the initiation method sequence 208 in the transfer data 110 added to the contact record that corresponds to the selected second contact.

Additionally, because the transfer data 110 added to the contact record includes an associated instance of the queue tree 128, the customer journey details 304 presented in the user interface 108 can also indicate identifiers of queues associated with individual contacts in the contact chain for the overall customer journey. In some examples, if the queue tree 128 in the displayed contact record identifies current, initial, next, and/or previous queues associated with the selected contact, but does not directly identify queues of other earlier and/or later contacts in the contact chain for the customer journey, the contact center platform 104 can use the contact ID sequence 212 to access one or more other contact records 106 associated with those earlier and/or later contacts in the contact chain. The contact center platform 104 can use instances of the queue tree 128 added to those contact records 106, and/or or other information in the contact records 106 about the queues associated with the corresponding contacts, to identify and display queue identifiers of the queues associated with the other earlier and/or later contacts in the contact chain for the customer journey.

The customer journey details 304 can also indicate other information about each of the individual contacts involved in the overall customer journey, such as start times of the individual contacts, end times of the individual contacts, identifiers of the representatives that handled the individual contacts, transcripts of the individual contacts, and/or other information. In some examples, the transcripts of the individual contacts can be combined into an overall cohesive customer journey transcript of the entire customer journey that can be displayed within the user interface 108 separately and/or in association with the individual contacts. In some examples, the contact center platform 104 can use the contact ID sequence 212 in the transfer data 110 added to the selected contact record, and use the corresponding contact IDs to access the corresponding contact records 106 in the contact record repository 114. The contact center platform 104 can accordingly use contact details 302 and/or other information indicated within the individual contact records 106 to identify data such as start times, end times, representative identifiers, transcripts, and/or other information associated with each of the contacts in the contact chain for the customer journey, and can display such information in the customer journey details 304.

In some examples, the user interface 108 and/or the customer journey details 304 may also indicate types of transfers between respective contacts. For example, based on transfer details 130 added to the selected contact record, and/or transfer details 130 added to other contact records 106 in the same contact chain identified by the contact sequence 126 added to the selected contact record, the user interface 108 may display information indicating whether respective transfers between pairs of contacts were cold transfers, warm transfers, or other types of transfers, information indicating durations of the transfers and/or after-contact work associated with the transfers, and/or any other information.

Accordingly, as shown in FIG. 3, a user may select one particular contact or associated contact record, but may view information about the selected contact as well as information about the larger customer journey associated with the selected contact. For instance, the user can select the second contact in the contact chain for the customer journey, in order to view information about the selected second contact in the user interface 108, but may also view information about all four contacts in the contact chain for the customer journey in the user interface 108. The user can thus use the user interface 108 to view information about the broader customer journey on the same screen, and in the same window or view, as information specifically about the second contact. The user can therefore be directly presented with the customer journey details 304 about the overall customer journey that includes a chain of multiple contacts when the user accesses information about the second contact, instead of the user separately looking up each distinct contact in the contact chain for the customer journey.

Figure 4:
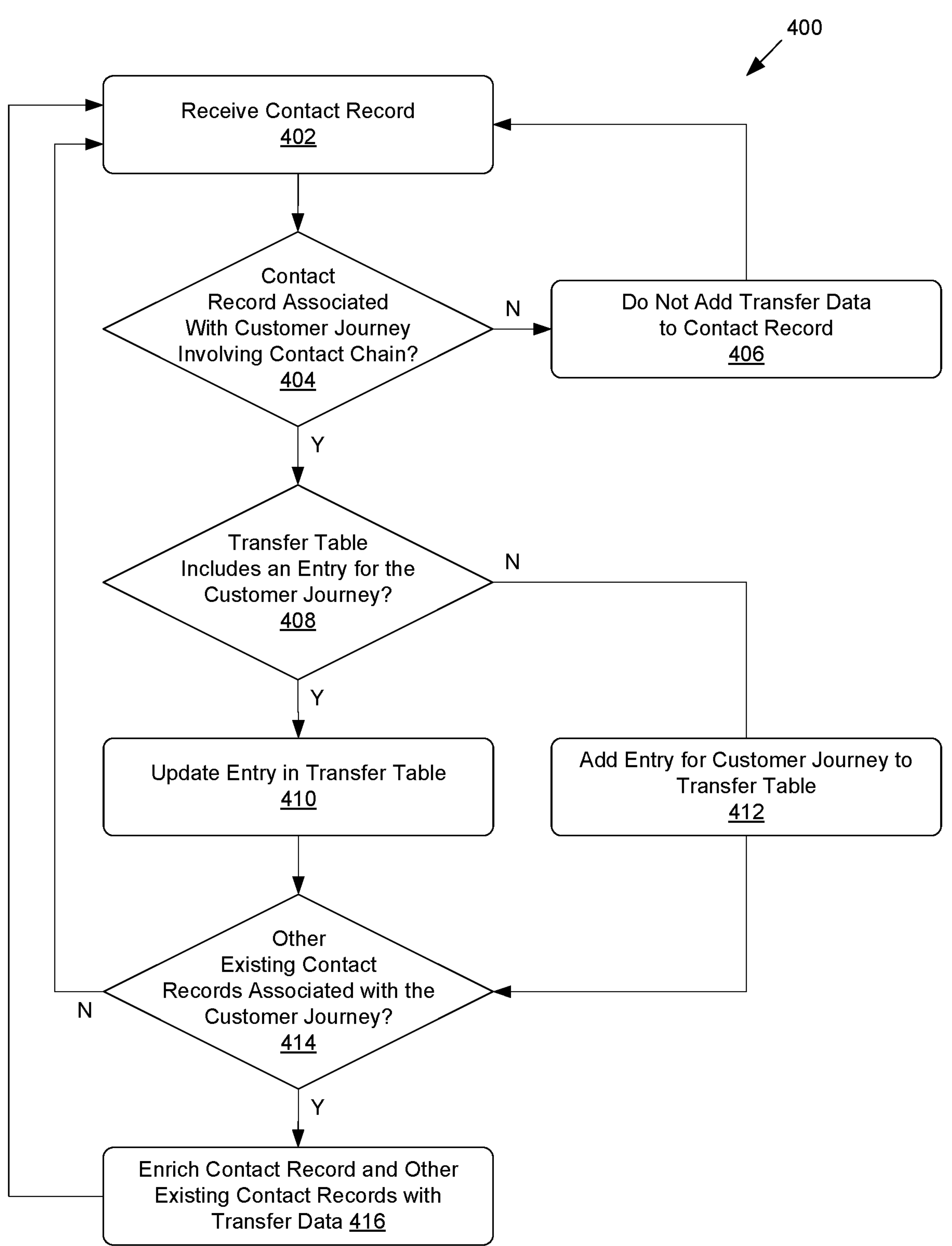
FIG. 4 shows a flowchart illustrating an example method for enriching contact records associated with a contact chain with transfer data about the contact chain.

FIG. 4 shows a flowchart illustrating an example method 400 for enriching contact records 106 associated with a contact chain with transfer data 110 about the contact chain. The method 400 shown in FIG. 4 can be performed by a computing system that executes the contact record enrichment system 102. An example system architecture for such a computing system is described below with respect to FIG. 5.

At block 402, the contact record enrichment system 102 can receive a contact record from the contact center platform 104. The contact record can be associated with a corresponding single contact handled via the contact center platform 104, such as a single call, a single chat session, a single email, a single text message, or any other single contact between a customer and a representative of the contact center. The contact record enrichment system 102 may, in some examples, subscribe to a stream of contact records 106 generated and output by the contact center platform 104 in association with corresponding contacts handled via the contact center platform 104. In other examples, the contact center platform 104 may send contact records 106 to the contact record enrichment system 102 individually and/or in batches. In still other examples, the contact record enrichment system 102 may monitor the contact record repository 114 for new contact records 106 added to the contact record repository 114 by the contact center platform 104, and can receive such a new contact record via the contact record repository 114 at block 402.

At block 404, the contact record enrichment system 102 can determine whether the contact record for the single contact is associated with a larger customer journey that involves a chain of multiple contacts. For example, the contact record enrichment system 102 can determine whether the contact record for the contact is associated with a larger customer journey based on whether the at least one of the initial ID 118, the previous ID 120, and/or the next ID 122 of the contact record indicates that the contact is linked to at least one other contact that preceded or followed the contact in a contact chain associated with a customer journey.

If the contact record enrichment system 102 determines that the contact record is not associated with a larger customer journey (Block 404-No), the contact record enrichment system 102 can determine at block 406 not to add transfer data 110 to the contact record. For example, if the previous ID 120 and the next ID 122 of the contact record are blank, and the initial ID 118 of the contact record is also blank or is the same as the contact ID 116 of the contact record, the contact record enrichment system 102 can determine that the contact record is not associated with a larger customer journey and can avoid adding transfer data 110 to the contact record. The contact record enrichment system 102 can return to block 402 to receive and/or process another contact record.

However, if the contact record enrichment system 102 determines that the contact record is associated with a larger customer journey (Block 404-Yes), the contact record enrichment system 102 can move to block 408. For example, if at least one of the previous ID 120 or the next ID 122 of the contact record is not blank, and/or the initial ID 118 not blank and is different from the contact ID 116 of the contact record, the contact record enrichment system 102 can determine that the contact record is associated with a larger customer journey that involves a contact chain of multiple contacts.

In response to determining that the contact record is associated with a larger customer journey (Block 404-Yes), at block 408 the contact record enrichment system 102 can determine whether the transfer table 132 includes an entry for the customer journey. For example, if at least one of the initial ID 118, the previous ID 120, or the next ID 122 of the contact record is not blank and is different from the contact ID 116 of the contact record, thereby indicating that the corresponding contact is linked to at least one other contact in the contact chain for the customer journey, the contact record enrichment system 102 can search the transfer table 132 for an entry that references one or more contacts with contact IDs that match the at least one of the initial ID 118, the previous ID 120, or the next ID 122 provided in the contact record.

If the contact record enrichment system 102 determines that the transfer table 132 already includes an entry associated with the customer journey (Block 408-Yes), at block 410 the contact record enrichment system 102 can update the entry in the transfer table 132 based on the contact record received at block 402. For example, if the next ID 122 of the contact record references a contact ID of an immediately-subsequent contact in the contact chain for the customer journey that is not yet included in the entry in the transfer table 132, the contact record enrichment system 102 can update the entry in the transfer table 132 to reference the contact ID of the immediately-subsequent contact in the contact chain, to update a transfer count associated with the customer journey, to update a count of a number of overall contacts in the contact chain associated with the customer journey, and/or to update any other information about the overall customer journey based on the contact record.

If the contact record enrichment system 102 determines that the transfer table 132 does not include an entry associated with the customer journey (Block 408-No), at block 412 the contact record enrichment system 102 can add such an entry to the transfer table 132 based on the contact record received at block 402. In some examples, because entries may be stored temporarily in the transfer table 132 such that a previous entry for the customer journey may have been deleted from the transfer table 132, the contact record enrichment system 102 may search the contact record repository 114 for one or more contact records that have contact IDs that match one or more of the initial ID 118, the previous ID 120, or the next ID 122 of the contact record. If any such contact records are found in the contact record repository 114, the contact record enrichment system 102 may use transfer data 110 and/or other data in those contact records to recreate an entry for the customer journey in the transfer table at block 412, and can update the recreated entry based on the new contact record received at block 402.

However, if no such contact records are found in the contact record repository 114, for instance if the contact record received at block 402 is the first contact record associated with the customer journey that the contact record enrichment system 102 has received, the contact record enrichment system 102 can use information in the contact record to add a new entry associated with the customer journey to the transfer table 132 at block 412. For example, the contact record enrichment system 102 can use the contact ID 116, the initial ID 118, the previous ID 120, or the next ID 122 of the contact record to determine a sequence of contact IDs, a number of transfers, a number of contacts, and/or other information indicated to be associated with the customer journey so far, and can add that information to the transfer table 132.

At block 414, the contact record enrichment system 102 can determine whether one or more other contact records 106 stored in the contact record repository 114 represent contacts that are also associated with the customer journey, such as contacts in the same contact chain associated with the customer journey. For example, the contact record enrichment system 102 may have previously received one or more other contact records 106 associated with the customer journey, and may have used the method shown in FIG. 4 to add or update the entry for the customer journey in the transfer table 132. In some examples, the contact record enrichment system 102 may have previously enriched one or more other contact records that are associated with the customer journey with corresponding transfer data 110.

If the contact record enrichment system 102 determines that no other contact records 106 stored in the contact record repository 114 are also associated with the customer journey (Block 414-No), the contact record enrichment system 102 can return to block 402 to receive and/or process another contact record.

However, if the contact record enrichment system 102 determines that one or more other contact records 106 stored in the contact record repository 114 are also associated with the customer journey (Block 414-Yes), at block 416 the contact record enrichment system 102 can enrich the contact record and the other contact records with transfer data 110 associated with the customer journey, by adding new transfer data 110 and/or updating previous transfer data 110 in the copies of the contact records 106 stored in the contact record repository 114. For example, based on an entry associated with the customer journey in the transfer table 132 that was updated or added at blocks 410 or 412, and/or based on other information in the contact record, the contact record enrichment system 102 can determine the contact sequence 126, queue tree 128, and/or transfer details 130 associated with the customer journey that can be added to the contact record as transfer data 110. Similarly, the contact record enrichment system 102 can add and/or update the same or similar transfer data 110 in the other contact records 106 associated with the customer journey. The contact record enrichment system 102 can generate and submit contact record updates 124 that cause the transfer data 110 to be added to, or updated in, corresponding copies of the contact records 106 in the contact record repository 114.

As an example, the contact record received at block 402 may be for a third contact in the contact chain for the customer journey, and contact records 106 for a first contact and a second contact in the contact chain for the customer journey may already be in the contact record repository 114. Such contact records 106 for the first contact and the second contact may previously have been enriched with transfer data 110 associated with the first contact and the second contact. Accordingly, based on the newly-received contact record for the third contact in the contact chain, the contact record enrichment system 102 can update the transfer data 110 in the existing contact records 106 for the first contact and the second contact in the contact chain to increment a transfer count and/or a contact count associated with the customer journey. Similar, the contact record enrichment system 102 can also update the transfer data 110 in the existing contact records 106 for the first contact and the second contact in the contact chain to add a contact ID of the third contact in the contact chain (if the contact ID 116 of the third contact had not already been provided via the next ID 122 of the contact record for the second contact), to add a contact ID for a fourth contact in the contact chain if the next ID 122 of the contact record indicates a new transfer to such a fourth contact, and/or to update any other type of transfer data 110 based on information provided in the newly-received contact record for the third contact in the contact chain. After adding transfer data 110 to, and/or updating existing transfer data 110 in, the current contact record and one or more existing contact records 106 at block 416, the contact record enrichment system 102 can return to block 402 to receive and/or process another contact record.

FIG. 5 shows an example system architecture 500 for a computing system 502 that can execute one or more elements of the contact record enrichment system 102 described herein. The computing system 502 can include one or more computers, servers, or other types of computing devices. In some examples, the contact center platform 104, the contact record repository 114, and/or other elements described herein can also be executed by, and/or be hosted on, the computing system 502 or other computing systems that have the same or a similar system architecture.

In some examples, elements of the contact record enrichment system 102, and/or other elements associated with the contact record enrichment system 102, can be distributed among, and/or be executed by, multiple computing systems or devices similar to the computing system 502 shown in FIG. 5. In some examples, such computing systems or devices may be part of a cloud computing environment or other computing environment.

As an example, the contact center platform 104 and the contact record repository 114 may be hosted by computing elements of a cloud computing platform, for instance via virtual machines, containers, or other physical and/or virtual computing resources of the cloud computing platform. The contact record enrichment system 102 may execute on other elements of the cloud computing platform, on a local computing device, or any other computing system. Accordingly, in this example, the contact record enrichment system 102 can subscribe to and/or otherwise receive contact records 106 provided by the cloud-hosted contact center platform 104, and can provide contact record updates 124 that enrich contact records 106 stored in the cloud-hosted contact record repository 114 with transfer data 110.

The computing system 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system 502. Any such non-transitory computer-readable media may be part of the computing system 502.

The memory 504 can store modules and data 506, including software or firmware elements, such as data and/or computer-readable instructions that are executable by one or more processors 508. For example, the memory 504 can store computer-executable instructions and data associated with the transfer table 132 and other elements of the contact record enrichment system 102. The modules and data 506 stored in the memory 504 can also include any other modules and/or data that can be utilized by the computing system 502 to perform or enable performing any action taken by the computing system 502. Such modules and data 506 can include a platform, operating system, and applications, and data utilized by the platform, operating system, and applications.

The computing system 502 can also have processor(s) 508, communication interfaces 510, a display 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with types of volatile (RAM) and/or nonvolatile (ROM) memory.

The communication interfaces 510 can include transceivers, modems, network interfaces, antennas, and/or other components that can transmit and/or receive data over networks or other connections. In some examples, the communication interfaces 510 can be used to exchange data between elements described herein, such as communications between the contact record enrichment system 102 and the contact center platform 104 and/or the contact record repository 114.

The display 512 can be a liquid crystal display, or any other type of display commonly used in computing devices. The output devices 514 can include any sort of output devices known in the art, such as the display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as a touch-sensitive display screen. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions, such as software or firmware, that embodies any one or more of the methodologies or functions described herein. The instructions can also reside, completely or at least partially, within the memory 504, processor(s) 508, and/or communication interface(s) 510 during execution thereof by the computing system 502. The memory 504 and the processor(s) 508 also can constitute machine readable media 520.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:

receiving, by an enrichment system executed by one or more processors of a computing system, a contact record associated with a first text chat session with a first representative, wherein the contact record:

was generated by a contact center platform, and indicates a first contact identifier assigned to the first text chat session by the contact center platform;

determining, by the enrichment system, that the first text chat session is part of a contact chain comprising a plurality of text chat sessions with a same customer, based on:

the contact record indicating at a second contact identifier of a second text chat session, with a second representative, that occurred in the contact chain, wherein the contact center platform generates distinct contact records, having distinct contact identifiers, for each text chat session in the plurality of text chat sessions; and enriching, by the enrichment system, the contact record generated by the contact center platform, by adding transfer data that comprises at least one of:

a contact sequence indicating an order of the distinct contact identifiers of the plurality of text chat sessions in the contact chain, a transfer count indicating a number of transfers that have occurred during the contact chain, or indications of initiation methods associated with individual text chat sessions in the plurality of text chat sessions.

2. The computer-implemented method of claim 1, wherein the transfer data further comprises a queue tree identifying queues within a contact center that are associated with the first representative and the second representative.

3. The computer-implemented method of claim 2, wherein the queue tree identifies at least one of:

a first queue associated with the first text chat session, a previous queue associated with a previous text chat session that immediately preceded the first text chat session in the contact chain, a next queue associated with a next text chat session that immediately followed the first text chat session in the contact chain, or an initial queue associated with an initial text chat session that initiated the contact chain.

4. The computer-implemented method of claim 1, further comprising:

receiving, by the enrichment system, a second contact record generated by the contact center platform, wherein the second contact record is associated with:

a third text chat session with a third representative, and a third contact identifier of the third text chat session;

determining, by the enrichment system, that the third text chat session is part of the contact chain, based on one or more identifiers in the second contact record corresponding to at least one of the first contact identifier associated with the first text chat session or the second contact identifier associated with the second text chat session;

generating, by the enrichment system, updated transfer data based on the transfer data and the second contact record, by updating at least one of:

the contact sequence to indicate an ordered sequence of the first contact identifier, the second contact identifier, and the third contact identifier of the third text chat session, the transfer count by incrementing the transfer count, or the indications of the initiation methods to indicate an initiation method of the third text chat session; and enriching, by the enrichment system, the second contact record with the updated transfer data.

5. The computer-implemented method of claim 4, wherein the transfer data added to the contact record is the updated transfer data, and is added to the contact record for the first text chat session in response to receipt of the second contact record.

6. The computer-implemented method of claim 1, wherein:

the enrichment system determines that the contact record includes the second contact identifier of the second text chat session during the contact chain based at least in part on an entry in a transfer table that is associated with the contact chain and that indicates that the second contact identifier is associated with the contact chain, and the transfer data is based at least in part on the entry in the transfer table.

7. The computer-implemented method of claim 6, further comprising updating, by the enrichment system, the entry in the transfer table based on the contact record.

8. The computer-implemented method of claim 1, wherein the transfer data in the contact record causes a user interface of the contact center platform to display, in response to a user accessing the contact record, details associated with the contact chain.

9. The computer-implemented method of claim 8, wherein the details comprise a timeline of the first text chat session and the second text chat session.

10. A computing system, comprising:

one or more processors, and memory storing computer-executable instructions that, when executed by the one or more processors, cause the one or more processors to:

receive a contact record associated with a first contact with a first representative of a contact center, wherein the contact record:

was generated by a contact center platform, indicates a first contact identifier assigned to the first contact by the contact center platform, and includes a first transcript of the first contact;

determine that the first contact is part of a contact chain comprising a plurality of contacts with a same customer, based on:

the contact record indicating at least a second contact identifier of a second contact, with a second representative of the contact center, that occurred in the contact chain, wherein the contact center platform generates distinct contact records, having distinct contact identifiers, for each contact in the plurality of contacts; and enrich the contact record generated by the contact center platform, by adding transfer data, associated with the contact chain, comprising a contact sequence indicating an order of the distinct contact identifiers of the plurality of contacts in the contact chain, wherein the contact sequence, in the transfer data added to the contact record, causes a user interface to display an aggregated transcript associated with the contact chain in response to the contact record being accessed via the user interface, the aggregated transcript comprising:

the first transcript of the first contact stored in the contact record, and a second transcript of the second contact, identified by the second contact identifier, stored in a second contact record.

11. The computing system of claim 10, wherein the transfer data further comprises a transfer count indicating a number of transfers that have occurred during the contact chain.

12. The computing system of claim 10, wherein the transfer data further comprises an indication of initiation methods associated with the first contact and the second contact.

13. The computing system of claim 10, wherein the transfer data further comprises a queue tree identifying queues within the contact center that are associated with the first representative and the second representative.

14. The computing system of claim 10, wherein the computer-executable instructions further cause the one or more processors to:

receive a third contact record associated with a third contact with a third representative of the contact center, wherein the third contact record is associated with a third contact identifier;

determine that the third contact is part of the contact chain, based on one or more identifiers in the third contact record corresponding to at least one of the first contact identifier associated with the first contact or the second contact identifier associated with the second contact;

generate updated transfer data based on the transfer data and the third contact record, by updating the contact sequence to indicate an ordered sequence of the first contact identifier, the second contact identifier, and the third contact identifier of the third contact;

enrich the third contact record with the updated transfer data; and update the transfer data added to the contact record for the first contact based on the updated transfer data.

15. The computing system of claim 10, wherein the computer-executable instructions further cause the one or more processors to:

receive a user selection of the first contact via the user interface;

access the contact record; and display, via the user interface, details associated with the contact chain based at least in part on the transfer data in the contact record.

16. The computing system of claim 15, wherein the details comprise a timeline, of the first contact and the second contact, that presents the aggregated transcript.

17. The computing system of claim 10, wherein:

the computer-executable instructions further cause the one or more processors to determine, based on the transfer data associated with the contact chain and additional transfer data associated with other contact chains, one or more metrics associated with the contact center, and the one or more metrics include at least one of:

a first average number of transfers per contact chain, a second average number of transfers associated with contact chains and a particular representative of the contact center, or a third average number of transfers associated with the contact chain and a particular queue within the contact center.

18. One or more non-transitory computer-readable media storing computer-executable instructions associated with an enrichment system that, when executed by one or more processors of a computing system, cause the computing system to:

receive a contact record associated with a first contact with a first representative of a contact center, wherein the contact record:

was generated by a contact center platform, indicates a first contact identifier assigned to the first contact by the contact center platform, and includes a first transcript of the first contact;

determine that the first contact is part of a contact chain comprising a plurality of contacts with a same customer, based on:

the contact record indicating at least a second contact identifier of a second contact, with a second representative of the contact center, that occurred in the contact chain, wherein the contact center platform generates distinct contact records, having distinct contact identifiers, for each contact in the plurality of contacts; and enrich the contact record generated by the contact center platform, by adding transfer data, associated with the contact chain, comprising a contact sequence indicating an order of the distinct contact identifiers of the plurality of contacts in the contact chain, wherein the contact sequence, in the transfer data added to the contact record, causes a user interface of the contact center platform to, in response to a user accessing the contact record, display a timeline of the contact chain that presents at least:

the first transcript of the first contact stored in the contact record, and a second transcript of the second contact, identified by the second contact identifier, stored in a second contact record.

19. The one or more non-transitory computer-readable media of claim 18, wherein the transfer data further comprises a queue tree identifying queues within the contact center that are associated with the first representative and the second representative.

20. The one or more non-transitory computer-readable media of claim 18, wherein the computer-executable instructions further cause the computing system to:

receive a third contact record associated with a third contact with a third representative of the contact center, wherein the third contact record is associated with a third contact identifier;

determine that the third contact is part of the contact chain, based on one or more identifiers in the third contact record corresponding to at least one of the first contact identifier associated with the first contact or the second contact identifier associated with the second contact;

generate updated transfer data based on the transfer data and the third contact record, by updating the contact sequence to indicate an ordered sequence of the first contact identifier, the second contact identifier, and the third contact identifier of the third contact;

enrich the third contact record with the updated transfer data; and update the transfer data added to the contact record for the first contact based on the updated transfer data.

* * * * *